(12) United States Patent
Osborne et al.

(10) Patent No.: US 7,987,233 B1
(45) Date of Patent: Jul. 26, 2011

(54) SYSTEM AND METHODS FOR FACILITATING A MULTIPARTY COMMUNICATIONS SESSION WITH A DYNAMICALLY DESIGNATED SESSION MANAGER

(75) Inventors: Robert John Osborne, Redmond, WA (US); Ling-Cheung Aaron Lo, Seattle, WA (US); Ajay P. Chitturi, Bellevue, WA (US); Leon Chih Wen Wong, Redmond, WA (US); David J. Simons, Redmond, WA (US); Vishal Thakkar, Kirkland, WA (US); Rakesh Tangirala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 10/642,127

(22) Filed: Aug. 15, 2003

(51) Int. Cl.
*G06F 15/16* (2006.01)
(52) U.S. Cl. ...................................................... 709/206
(58) Field of Classification Search ................... 709/206
See application file for complete search history.

(56) References Cited

U.S. PATENT DOCUMENTS

| | | | |
|---|---|---|---|
| 5,369,705 A | 11/1994 | Bird et al. | |
| 5,473,599 A * | 12/1995 | Li et al. | 370/219 |
| 5,634,011 A * | 5/1997 | Auerbach et al. | 709/242 |
| 5,862,329 A | 1/1999 | Aras et al. | |
| 5,867,653 A | 2/1999 | Aras et al. | |
| 5,991,385 A | 11/1999 | Dunn et al. | |
| 6,078,957 A * | 6/2000 | Adelman et al. | 709/224 |
| 6,151,621 A | 11/2000 | Colyer et al. | |
| 6,522,435 B1 * | 2/2003 | Chang et al. | 398/49 |
| 6,973,023 B1 * | 12/2005 | Saleh et al. | 370/217 |
| 7,177,951 B1 * | 2/2007 | Dykeman et al. | 709/249 |
| 2001/0024433 A1 * | 9/2001 | Vanttinen | 370/338 |
| 2002/0042693 A1 * | 4/2002 | Kampe et al. | 702/186 |
| 2002/0052957 A1 * | 5/2002 | Shimada | 709/225 |
| 2002/0156875 A1 * | 10/2002 | Pabla | 709/220 |
| 2003/0008674 A1 * | 1/2003 | Cudak et al. | 455/466 |
| 2003/0091027 A1 | 5/2003 | Celi, Jr. et al. | |
| 2003/0091175 A1 | 5/2003 | Celi, Jr. et al. | |
| 2003/0135565 A1 * | 7/2003 | Estrada | 709/206 |
| 2004/0071099 A1 * | 4/2004 | Costa-Requena et al. | 370/260 |
| 2004/0093433 A1 * | 5/2004 | Armbruster et al. | 709/247 |
| 2004/0215614 A1 * | 10/2004 | Doyle et al. | 707/8 |
| 2004/0225716 A1 * | 11/2004 | Shamir et al. | 709/204 |

OTHER PUBLICATIONS

R. Sparks, "The SIP Refer Method" http://tools.ietf.org/html/draft-ietf-sip-refer-06, Jul. 17, 2002. pp. 1-21.*
Rhee et al. Group communication support for distributed collaboration systems. Cluster Computing 2 (1999) 3-16.*

(Continued)

*Primary Examiner* — Yasin Barqadle
*Assistant Examiner* — John M Macilwinen
(74) *Attorney, Agent, or Firm* — Perkins Coie LLP

(57) ABSTRACT

A system and methods for facilitating multiparty communications sessions with a plurality of participants and for dynamically designating a communications session manager. More particularly, a system and methods, including protocols, for: establishing a multiparty communications session between a plurality of participants and their respective communication devices in a full-mesh topology; establishing a dynamically designated session manager uniquely associated with a first participant of the multiparty session and, hence, such participant's communication device; as necessary, adding and removing participants and their respective communication devices from the multiparty communications session; and, designating, or electing, another participant as session manager when the first participant exits the multiparty communications session. The methods also enable participants to maintain consistent lists of session participants and establish peer to peer communication links between the participants.

28 Claims, 21 Drawing Sheets

OTHER PUBLICATIONS

Fetzer and Crisitian. A Highly Available Local Leader Election Service. IEEE Transactions on Software Engineering. vol. 25. No. 5. Sep./Oct. 1999.*

Miladinovic and Stadler, "Optimization of signaling traffic in centralized conferences using SIP," in Proc. WSEAS ICOMIV 2002, 2nd WSEAS Int. Conf. Multimedia, Internet, and Video, Skiathos Island, Greece, Sep. 2002, pp. 1-6.*

Schulzrinne and Rosenberg, "Signaling for Internet telephony", Proc. ICNP '98, Austin, TX, Oct. 1998. pp. 1-10.*

* cited by examiner

SYSTEM AND METHODS FOR FACILITATING A MULTIPARTY COMMUNICATIONS SESSION WITH A DYNAMICALLY DESIGNATED SESSION MANAGER

TECHNICAL FIELD

The present invention relates, generally, to multiparty communications systems and methods, and, more particularly, to multiparty communications systems and methods with a dynamically designated communications session manager.

BACKGROUND OF THE INVENTION

Multiparty communications systems that permit communication between multiple participants are becoming increasingly popular, particularly within the Internet architecture. Originally, communications applications permitted communication between only two participants. Such one-on-one communication required little management because, with only two participants, a system for managing participants within a communications session was unnecessary. If one participant lost its connection to the communications session, then the other participant's connection was also lost.

A communications session involving more than two participants (i.e., a "multiparty communications session" or a "multiparty session") introduces potential requirements which must be addressed by participant management. First, when a participant loses a connection in a multiparty session, the other participants should not lose their connections to each other. Second, already existing multiparty sessions must provide a mechanism for joining new participants and enabling current participants to exit the multiparty session. Third, with participants leaving and joining multiparty communications sessions, it is necessary to maintain an updated participant list, or roster, so that current participants of the multiparty session know who is connected to the multiparty session. The maintaining of an updated participant list, or roster, also assists in managing peer to peer communication channels between participants.

One method of participant management involves the use of a designated communications server, also known as a central server. In such a method, every participant wanting to join a multiparty communications session contacts the designated communications server. The designated communications server establishes a connection with each such participant and also maintains a list of current participants. Then, each joining participant accesses the list residing on the designated communications server to determine the identities of the other participants already a part of the communications session. When a participant leaves the communications session, the list of participants located at the designated communications server is updated accordingly. Unfortunately, the use of a designated communications server for ensuring synchronization of the list of participants can be costly for the consumer. Further, if the designated communications server crashes or goes offline, then the entire multiparty communications session is lost.

As is known in the art, a multiparty communications session may exist without a dedicated communications server. By having direct connections between participants, there is no need for such a central server to manage connections or a list of participants because each participant knows who is connected to the multiparty session and knows how to establish communications with the other connected participants. For example, in a multiparty session, Participant A knows who is connected to the multiparty session because every other participant within the multiparty session is directly connected to Participant A. While such a communications session eliminates the need for a dedicated communications server, certain disadvantages with such a communications session may exist. One common disadvantage manifests itself when a participant is trying to connect to an already existing multiparty session. For example, if a multiparty communications session already exists between Participant A, Participant B, and Participant C, then for Participant D to join the multiparty session individual connections must be made from Participant D to Participant A, from Participant D to Participant B, and from Participant D to Participant C. After Participant D establishes a connection to Participant A, but before Participant D establishes connections to Participant B and Participant C, there exists a period of time when Participant D is not known by Participant B and Participant C to be in the multiparty session. The result is a disjointed multiparty communications session where only Participant A knows all the participants within the multiparty session for such period of time. During such a disjointed multiparty communications session, communication may be lost or not properly provided to each participant currently within the session.

To prevent a disjointed multiparty communications session from occurring, it is known in the art to use a different type of communications session configuration. Instead of having every participant connect directly to all other participants of a multiparty session, one participant is designated as a connection hub in a hub-and-spoke, or star, configuration or topology. Similar to the topology created by the use of a dedicated communications server, one of the participants in a hub-and-spoke topology acts as a central point of the communications session. For example, if Participant A is designated as the central point of a communications session, then all other participants connect to Participant A and communicate with each other through Participant A. While eliminating the occurrence of a disjointed session, the hub-and-spoke, or star, configuration has disadvantages similar to those present when a dedicated communications server is employed in a multiparty communications session. For example, if the participant at the central point of the multiparty communications session loses connection, then the multiparty communications session must end or continue to utilize the computing and network resources of the central-point participant.

Accordingly, there is a need in the art for a system and method for managing a participant list, or roster, for a multiparty communications session without the need of a dedicated communications server.

There is also a need in the art for a system and method for providing multiparty communications sessions that do not become disjointed and that do not rely on a connection to a common or central point.

Additionally, there is a need in the art for a system and method for providing multiparty communications sessions where participants can join and leave the session without terminating the ongoing multiparty communication session between other participants.

SUMMARY OF THE INVENTION

Broadly described, the present invention comprises a system and methods for facilitating multiparty communications sessions with a plurality of participants and for dynamically designating a communications session manager (i.e., a "session manager"). More particularly, the present invention comprises a system and methods, including protocols, for: establishing a multiparty communications session between a plurality of participants and their respective communication devices in a full-mesh topology; establishing a dynamically designated session manager uniquely associated with a first participant of the multiparty session and, hence, such participant's communication device; as necessary, adding and removing participants and their respective communication devices from the multiparty communications session; and, designating, or electing, another participant as session manager when the first participant exits the multiparty communications session.

Advantageously, the present invention provides multiparty communications sessions with or without the involvement of a central server or dedicated communications server such as a multipoint control unit (MCU). Also, the present invention accounts for every participant within the multiparty communications session and reduces the possibility of disjointed dialog occurring between participants thereof. Every participant attempting to join the multiparty communications session must communicate with the dynamically designated session manager. The dynamically designated session manager ensures that such participants join the communications session sequentially, thus reducing the possibility of disjointed communications. By providing the flexibility of a dynamically designated, or dynamically elected, session manager coupled with the arrangement of participants in a full-mesh topology, a multiparty communications session in accordance with the present invention is not disrupted when a participant serving as the session manager terminates its connection to the multiparty session because a new session manager may be designated. Through use of an election process for such designation of a new session manager, the present invention provides a smooth transition of session management from one participant to another participant. Additionally, the use of a full-mesh topology, where each participant is connected to every other participant, provides for the synchronization of information concerning a multiparty communications session and its participants.

Other features and advantages of the present invention will become apparent upon reading and understanding the present specification when taken in conjunction with the appended drawings.

DETAILED DESCRIPTION OF THE INVENTION

Figure 1:
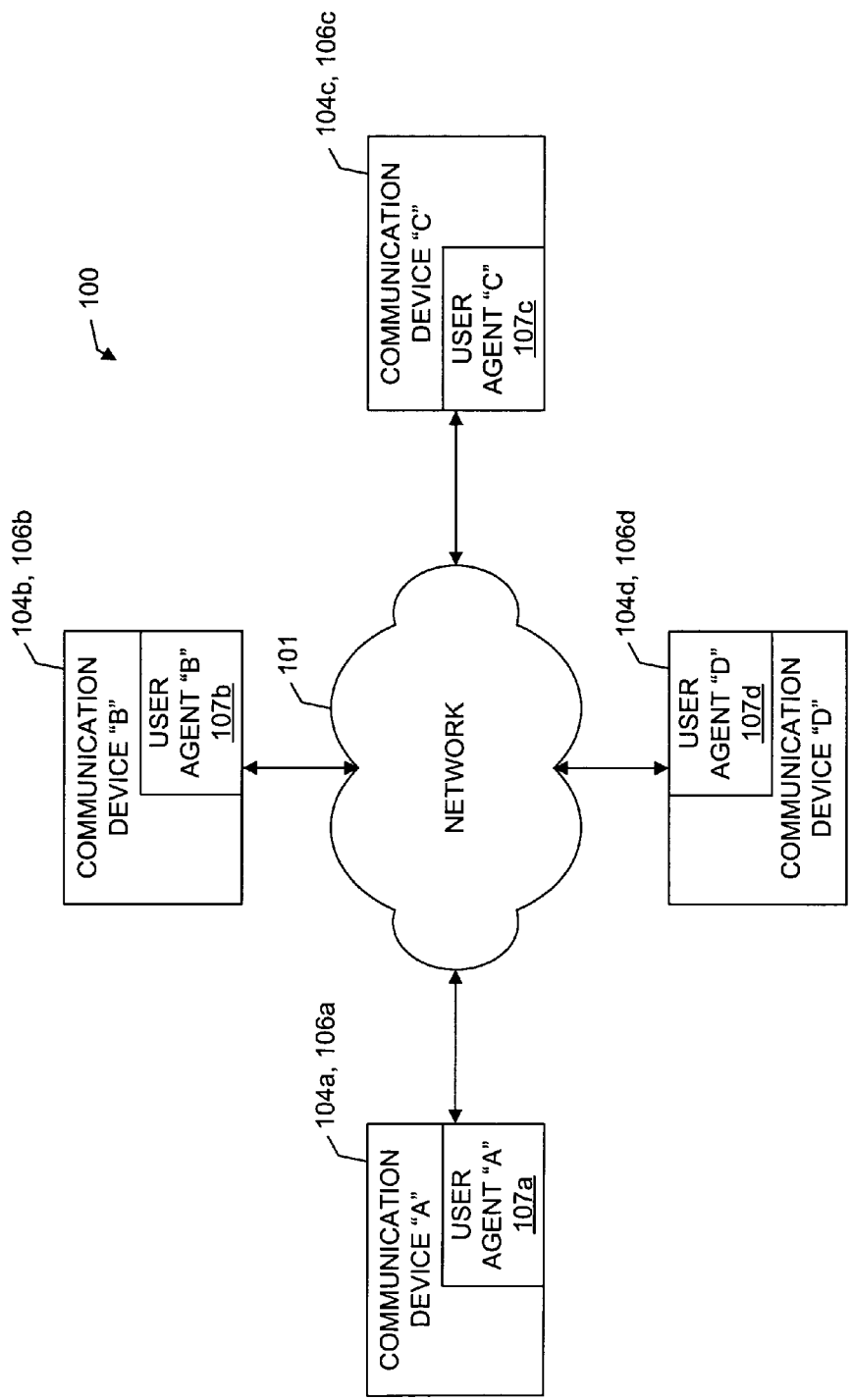
FIG. 1 displays a block diagram representation of the structural relationship of a plurality of participants of a multiparty communications session and the respective communication devices thereof in accordance with an exemplary embodiment of the present invention.

Referring now to the drawings, in which like numerals represent like components or steps throughout the several views, FIG. 1 displays a block diagram representation of the structural relationship of a plurality of participants 104 of a multiparty communications session 100 and the respective communication devices 106 thereof in accordance with an exemplary embodiment of the present invention. The communications session 100 comprises a plurality of participants 104 (i.e., also sometimes referred to herein as "participants 404") with each participant 104 including a communication device 106 (i.e., with the alphabetic subscripts in FIG. 1 designating different participants 104). Each participant 104 (and, hence, each communication device 106) includes a respective user agent 107 which facilitates communication with the other participants 104 of the multiparty session 100. The number of participants 104 and user agents 107 within a communications session 100 may vary depending on the number of participants within the communications session 100 and, therefore, the communications session 100 is not limited to four participants 104, communication devices 106, and user agents 107 as shown in FIG. 1.

The participants 104 and their communication devices 106 are communicatively connected via a communication network 101 (i.e., also sometimes referred to herein as a "network 101"). One skilled in the art will recognize that a network 101 typically comprises the infrastructure and facilities appropriate to communicatively connect a group of two or more communication devices 106 (including, without limitation, a plurality of computer systems in communication with each other). Such a network 101 and communication devices 106 may be configured in multiple topologies including, but not limited to, star, bus, or ring configurations. Also, a network 101 and communication devices 106 may be broadly categorized as belonging to a particular architecture including, but not limited to, peer-to-peer or client/server architectures. The network 101 may additionally be classified by the geographical location of the communication devices 106 and the types thereof. For example, a network 101 communicatively connecting a plurality of computer systems or servers located proximate to each other, such as within a building, is referred to as a local-area network (LAN); if the computer systems are located farther apart, the network 101 is generally referred to as a wide-area network (WAN), such as the Internet; if the computer systems are located within a limited geographical area, such as a university campus or military establishment, the network 101 is referred to as a campus-area network (CAN); if the computer systems are connected together within a city or town, the network 101 is referred to as a metropolitan-area network (MAN); and if the computer systems are connected together within a user's home, the network 101 is referred to as a home-area network (HAN).

Each participant 104 and communication device 106 thereof connects communicatively with the network 101 and, therefore, connects communicatively with each other participant 104 and communication device 106 thereof. Communication devices 106 may include, but are not limited to, a desktop computer, laptop computer, mobile computer, server computer, wireless phone, personal digital assistant (PDA), and any other device capable of communicating with another communication device 106. In an exemplary embodiment of the present invention, the communication devices 106 are similar to the computer system 210 described below with reference to FIG. 2. Each communication device 106 comprises a respective software domain 300 (i.e., as described below with reference to FIG. 3) having a user agent 107 that assists in facilitating communication with other communication devices 106. Each user agent 107, through use of the communication device's 106 network interface and other appropriate hardware and software components, connects communicatively to the network 101 for the bi-directional communication of signals and media therewith and, therefore, connects communicatively to each other user agent 107 for the bi-directional communication of signals and media therewith. Due at least in part to the user agents 107, the communication devices 106 have the capability of performing multiparty conferencing. Multiparty communication sessions 100 may be established in accordance with a number of common multiparty conferencing standards, including, but not limited to, server-based conferencing and client-based distributed conferencing (i.e., also known as full-mesh conferencing). Server-based conferencing, typically, requires a central server for signaling, media transfer, and managing the list of participants of a communications session 100. Client-based distributed conferencing, generally, utilizes peer-to-peer (p2p) signaling and media transfer, but requires a distributed membership state where each participant stores a partial or full list of participants of a communications session 100 and changes within the membership state are propagated by peer. In an exemplary embodiment of the present invention, the user agents 107 (and, hence, the participants 104 and communication devices 106) communicate via a modified version of client-based distributed conferencing. Similar to client-based distributed conferencing, the user agents 107 employ bi-directional p2p signaling and media transfer via the network 101. Unlike client-based distributed conferencing, however, a session manager 401 keeps admission of new user agents 107 (and, hence, new participants 104 and communication devices 106) in sequential order. The session manager 401 maintains and retains the authoritative participant list 322, or roster 322, while each user agent 107 retains a complete, but non-authoritative, copy of the current participant list 322. The participant list 322, or roster 322, includes information or data identifying the participants 104 of a communications session 100.

One skilled in the art will recognize that connecting communicatively may include or require any appropriate type of connection for the bi-directional communication of signals and/or media including, but not limited to, analog, digital, wired and wireless communication channels. Such communication channels may utilize, but not be limited to, copper wire, optical fiber, radio frequency, infrared, satellite, or other facilities and media.

Figure 2:
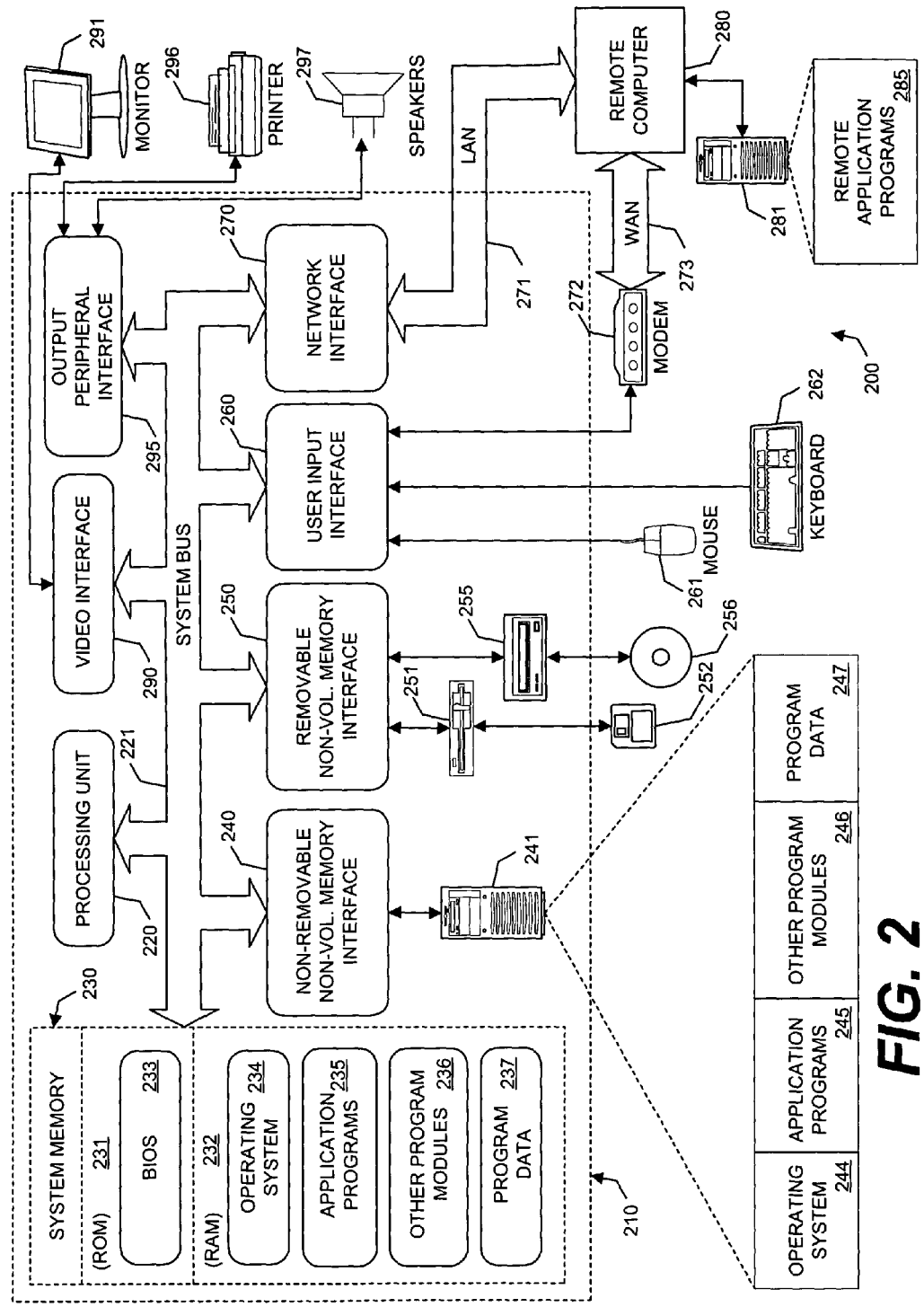
FIG. 2 displays a block diagram representation of a computing environment and computer systems thereof which the present invention may utilize in accordance with an exemplary embodiment thereof.

FIG. 2 displays a block diagram representation of a computing environment 200 and computer systems 210, 280 thereof which the present invention may utilize in accordance with an exemplary embodiment thereof. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the present invention is operational with numerous other general purpose or special purpose computing system environments or configurations. Examples of well-known computing systems, environments, and/or configurations that may be appropriate or suitable for use as communication devices 106 of the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may also be described in the general context of comprising computer-executable instructions, such as program modules, being executed by a computer system. Generally, program modules include routines, programs, programming, objects, components, data, data structures, etc. that perform particular tasks or implement particular abstract data types. The present invention may be practiced in distributed computing environments where tasks are performed by remote processing devices that are linked through a communications network. In a distributed computing environment, program modules may be located in both local and remote computer storage media, including, without limitation, in memory storage devices.

With reference to FIG. 2, an exemplary communication device 106 of the present invention includes a general purpose computing device in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

Computer system 210 typically includes a variety of computer-readable media. Computer-readable media may comprise any available media that can be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which can be used to store the desired information and which can be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/ nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bi-directional communication link between the computers may be used.

Figure 3:
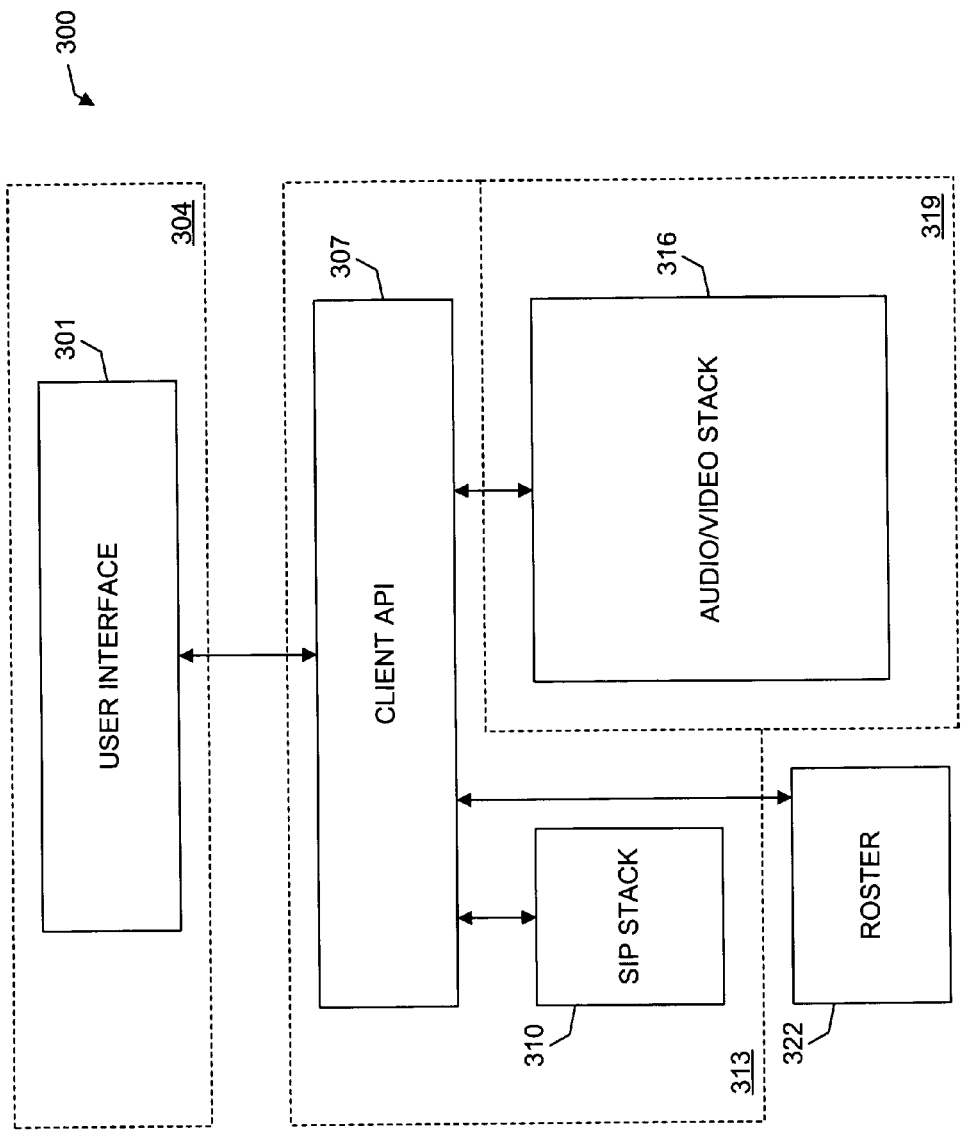
FIG. 3 displays a block diagram representation of a software domain of a communication device of the present invention in accordance with an exemplary embodiment thereof.

FIG. 3 displays a block diagram representation of a software domain 300 of a communication device 106 of the present invention in accordance with an exemplary embodiment thereof. The software domain 300 resides on a communication device 106, such as a computer system 210 illustrated in FIG. 2, and is configured with hardware and software appropriate to perform tasks and provide capabilities and functionality as described herein. More particularly, the software domain 300 comprises a user interface 301, client application programming interface (API) 307, session initiation protocol (SIP) stack 310, an audio/video stack 316, and a roster 322. Together, the user interface 301, client API 307, SIP stack 310, audio/video stack 316, and roster 322 form and function as part of a user agent 107, as described above with reference to FIG. 1. In an exemplary embodiment of the present invention, a software domain 300 resides on each of the communication devices 106 and assists in connecting users to a communications session 100 via the network 101 and in designating a session manager 401 for the communications session 100.

The user interface 301 provides a user with an interface for partaking in a communications session 100. In an exemplary embodiment of the present invention, the user interface 301 includes, but is not limited to, a message window for displaying messages, list of favorite participants, participant list for a communication session, text box for writing a message, and submit button for sending a message. Additionally, the user interface 301 may comprise programming, program modules, or machine instructions that perform or cause the performance of tasks: for displaying messages, the list of favorite participants, and the participant list for a communication session 100; for inputting or writing messages; and, for sending messages, when executed by the processing unit 220 of the computer system 210. One skilled in the art will recognize that the user interface 301 may be designed similar to instant messaging applications such as "MSN® MESSENGER" available from Microsoft Corporation of Redmond, Wash. The present invention, however, is not limited to instant messaging and, therefore, the present invention may relate to any type of communications session 100 between multiple participants 104 which may join or leave the communications session 100.

The client API 307 connects communicatively and interacts with the user interface 301, SIP stack 310, audio/video stack 316, and roster 322 through the inter-process communication of data, programming instructions, and/or commands, as the case may be. One skilled in the art will recognize that an API typically comprises a set of routines, programming, programming instructions, or program modules used by an application program to guide the execution of procedures by an operating system. In an exemplary embodiment of the present invention, the client API 307 provides a set of routines, programming, programming instructions, or program modules for communicating and interacting with the user interface 301, SIP stack 310, audio/video stack 316, and roster 322. Additionally, the client API 107 provides and receives SIP calls that enable multiparty conferencing and the designation of a new session manager 401, which are described in more detail below with reference to FIGS. 6-13.

Typically, the client API 307 comprises an abstraction layer that enables the establishment of communications sessions 100 by connecting participants 104 to other participants 104 using Session Initiation Protocol via the SIP stack 310. The SIP stack 310 comprises system memory 230, preferably, random access memory (RAM) 232, which stores a plurality of primitives and/or messages which implement the SIP protocol in connection with the methods described herein. The SIP stack 310 handles the session calls between participants 104 which assist in setting up a communications session 100. All SIP session calls are made through the SIP stack 310 and, therefore, the SIP stack 310 enables dialog between participants 104.

The audio/video stack 316 comprises system memory 230 (i.e., preferably, random access memory (RAM) 232) and/or non-volatile memory 240, 250 which stores audio and video data for communicating media within a communications session 100. The audio/video stack 316 is used in connection with the SIP stack 310 when communicating audio and video data that requires more bandwidth than is allocated for a SIP message. Audio and/or video data may be placed on the stack 316 when audio and/or video data is provided to or received from participants 104.

For example and not limitation, if a user desires to set up a communications session 100, then the user selects a corresponding option from the user interface 301. In response, a routine of the user interface 301 associated with the option is executed by the processing unit 220 and calls an appropriate routine of the client API 307. The client API routine creates a high level session object and makes a call to the SIP stack 310 to set up the communications session 100. Responsive thereto, the SIP stack 310 communicates with the other participants 104 and sets up the multiparty session 100. The SIP stack 310 then communicates to the client API routine that the multiparty session 100 has been created. Finally, the client API routine communicates to the user interface routine that the multiparty session 100 has been created.

In an exemplary embodiment of the present invention, the user interface's 301 routines, program modules, programming, and/or machine instructions reside, preferably, in an executable binary file stored in the hard disk drive 251 of each participant's computer system 210. The client API 307 routines, program modules, programming, and/or machine instructions and the SIP stack 310, preferably, reside in a dynamic-link library (dll) stored in the hard disk drive 251 of each participant's computer system 210. Also, the audio/video stack 316, preferably, resides in a separate dynamic-link library (dll) stored in the hard disk drive 251 of each participant's computer system 210.

The roster 322 (i.e., sometimes referred to herein as the "participant list 322") comprises list data identifying each participant 104 within a communications session 100. Such data may include, but is not limited to, a unique identifier, participant or user name, or uniform resource identifier. The roster 322, typically, resides in the random access memory (RAM) 232 of each participant's computer system 210 and provides the client API 307 thereof with information about each participant 104 of the communications session 100 when requested.

The Session Initiation Protocol (SIP), an application-layer control/signaling protocol, is a standard protocol that is well-known to one skilled in the art. Briefly described, SIP supports multiparty conferencing between user agents 107. SIP provides the standard for initiation, modification, and termination of a conferencing session. Each multiparty conference is represented by SIP relationships between user agents 107 and is managed by SIP dialog between user agents 107. SIP can support several models of multiparty conferencing such as, but not limited to, loosely coupled conferencing, fully distributed multiparty conferencing, and tightly coupled conferencing. Loosely coupled conferencing lacks a signaling relationship between user agents; does not have a central point of control, such as a central server; and the participation list 322 is learned through control information that is passed during the conference using, for example, the Real Time Control Protocol (RTCP). Fully distributed multiparty conferencing comprises a signaling relationship between each of the participants without a central point of control. Tightly coupled conferencing utilizes a central point of control or focus with each participant 104 connecting to the central point during the communications session 100. In an exemplary embodiment of the present invention, the communications sessions 100 between user agents 107 resemble tightly coupled conferencing.

SIP works in conjunction with other common protocols such as, but not limited to, Real-time Transport Protocol (RTP), Real-Time Streaming Protocol (RTSP), Media Gateway Control Protocol (MEGACO), and Session Description Protocol (SDP). Together with other common protocols, SIP enables user agents 107 to find and connect to other user agents 107, thus creating a communications session 100. Additionally, SIP enables other user agents 107 to join an already existing communications session 100. SIP provides the necessary primitives used to implement a variety of services, however, SIP does not provide services or program modules, such as the services or program modules associated with the client API 307 described herein, nor the methods or protocols described herein.

For example and not limitation, a SIP message from a first participant 104a inviting a second participant 104b to join a communications session 100 is provided in Table 1. The first line of the SIP message contains the message name. With reference to Table 1, the message name includes an INVITE primitive to a Participant B and the SIP version number. The subsequent lines of the SIP message correspond to header fields related to the INVITE primitive. The "To" header field may contain a display name (i.e., Participant B) and a SIP uniform resource identifier (URI) (i.e., sip: B@microsoft.com) that directs the message to the intended recipient. The "From" header field may also contain a display name (i.e., Participant A), and a SIP URI (i.e., sip: A@microsoft.com) that indicates the message originator. The "Call-ID" header field forms part of the globally unique dialog identifier. Typically the "Call-ID" header field is generated by combining a random string with the originator's host name or interne protocol address. Together, the "To", "From", and "Call-ID" header fields define a dialog or peer-to-peer SIP relationship. The "CSeq" header field, also known as the command sequence header field, contains an integer and a SIP method name. The integer, generally, is incremented sequentially for each new message within the dialog/session. The "Contact" header field provides the recipient with a SIP URI that represents a direct path back to the message originator. The "Contact" header informs recipients where to send subsequent messages or requests. The "Supported" header field indicates what type of communications session 100 is supported and desired by the calling participant 104 (i.e., a multiparty session 100). The "EndPoints" header field informs the recipient of the other participants 104 within the communications session 100 and is used in an INVITE message when establishing a new multiparty communications session 100. The "Content-Type" header field describes the type of message (i.e., an instant message, audio data, or video data). The "Content-Length" header field provides the byte size of the message. After the header fields and between the ellipses, the message is provided. Other header fields will be defined when introduced within this description.

TABLE 1

INVITE sip:B@microsoft.com SIP/2.0
To: Participant B <sip:B@microsoft.com>
From: Participant A <sip:A@microsoft.com>
Call-ID: 1234567890
CSeq: 1 INVITE
Contact: sip:A@microsoft.com
Supported: multiparty
EndPoints: Participant A <sip:A@microsoft.com>
Content-Type: application/SDP
Content-Length: XXX
. . .
m = message 5060 sip sip:A@microsoft.com
. . .

One skilled in the art will recognize that the Session Initiation Protocol (SIP) is one of many signaling protocols that may be used to implement this invention. Accordingly, the present invention may be implemented with response codes and header fields different than those described herein and, therefore, the present invention should not be limited to using the Session Initiation Protocol.

Figure 4:
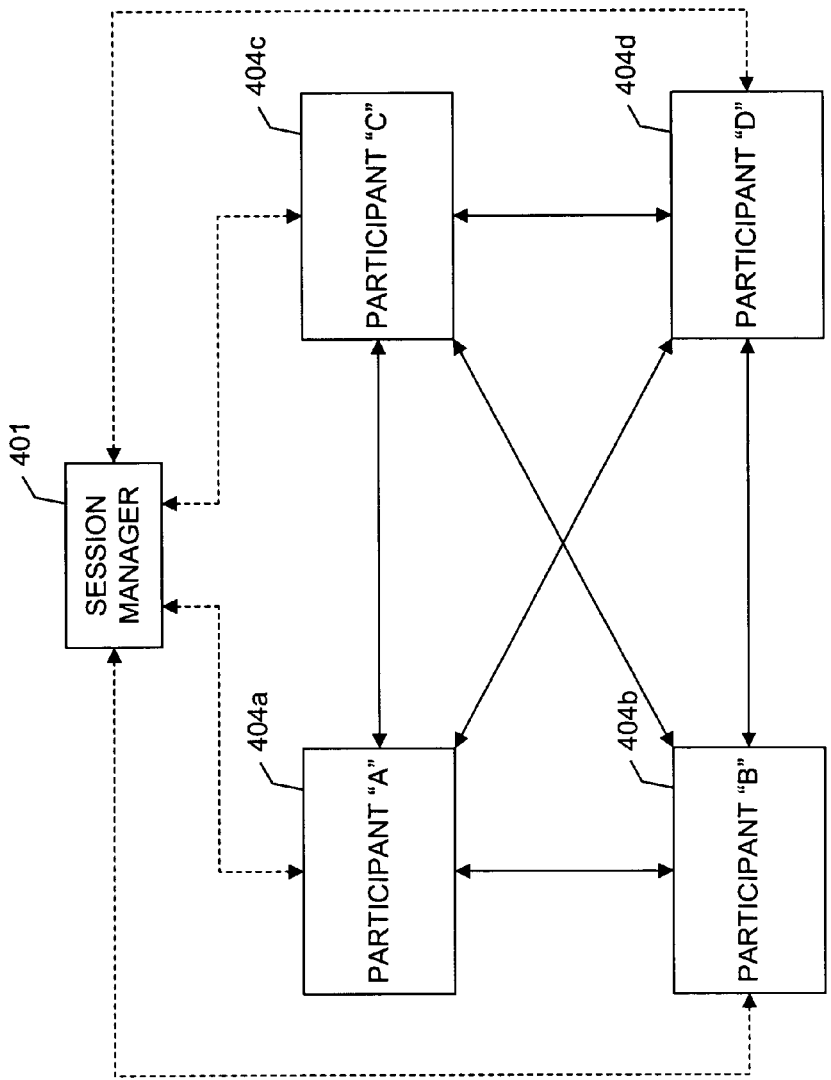
FIG. 4 displays a block diagram logical representation illustrating a multiparty communications session with a communication session manager not associated with a participant in accordance with an exemplary embodiment of the present invention.

FIG. 4 displays a block diagram logical representation illustrating a multiparty communications session 100 with a communications session manager 401 not associated with a participant 404 in accordance with an exemplary embodiment of the present invention. The multiparty communications session 100 comprises a session manager 401 and several participants 404 (i.e., sometimes referred to herein as "participants 104"), including Participant A 404a through Participant D 404d. Participants 404 connect to a multiparty session 100 through the user agent 107 and software domain 300 residing on their respective communication device 106. The number of participants 404 within a multiparty session 100 may vary depending on how many participants 404 join a particular multiparty session 100, therefore, the multiparty session 100 is not limited to four participants 404 as shown in FIG. 4.

Each participant 404 connects communicatively with the session manager 401. FIG. 4 illustrates, by way of example, the connection between the participants 404 and the session manager 401, but one skilled in the art will recognize that different configurations exist. The dashed-lines between the participants 404 and the session manager 401 represent session management calls. Session management calls are communications from the participants 404 to the session manager 401 that include data concerning connection to the multiparty session 100, such as initiation requests, termination requests, modification requests, and invitation requests. Session management calls enable the session manager 401 to successfully manage the participant list 322, or roster 322, of the current multiparty session 100.

Additionally, each participant 404 connects communicatively with each other participant 404. The solid-lines between the participants 404 represent media calls. Media calls are communications between participants 404 and include, but are not limited to, text, audio, and video. Unlike the Session Initiation Protocol which assumes that all data will be transferred over a signaling layer, media calls may create an explicit call by using the INVITE primitive provided by SIP. In other words, a multiparty session 100 between the participants 404 is created before media is transferred. Typically, media is subsequently transferred over an instant messaging session, however, separate audio and video sessions may be created between each participant 404, if necessary due to bandwidth constraints. Alternatively, media may be transferred through a media multipoint control unit (MCU) that, for example, may be located on a central server. One skilled in the art will recognize that with central session control and a coordination point, a communications session 100 may be constructed in a variety of topologies that utilize the advantages of the present invention including, but not limited to, full-mesh topology, MCU-based topology, and a hierarchical fan-out topology.

The session manager 401 ensures that the participant list 322, or roster 322, properly reflects the participants 404 within the current communications session 100. Accordingly, all session calls are directed to the session manager 401. Additionally, the session manager 401 may also store other information about the multiparty session 100 that might be coordinated to each of the participants 404 within a communications session 100. The session manager 401 synchronizes session actions such as, but not limited to, participants 404 joining a communications session 100, participants 404 leaving a communications session 100, and inviting participants 404 into a communications session 100. Other synchronization roles may also be handled by the session manager 401, such as moderation of a distributed meeting. The session manager 401 also implements a rule set for the particular communications session 100. Such rules may include, but are not limited to, access restrictions, session duration, and session capacity. By way of example, and not limitation, the session manager 401 resides at a different location than Participant A 404a, Participant B 404b, Participant C 404c, and Participant D 404d. Such a location may include, but is not limited to, a central server, MCU, or remote client computer.

For example and not limitation, if Participant A 404a, Participant B 404b, and Participant C 404c are members of a communication session 100, then Participant D 404d must send a session call to the session manager 401 to request admission to the communications session 100. Alternatively, Participant A 404a, Participant B 404b, or Participant C 404c may "refer" Participant D 404d to the session by sending a "refer" session call to the session manager 401. The session manager 401 may then apply the rule set to determine if Participant D 404d should be allowed within the current communications session 100. If the session manager 401 determines that Participant D 404d may have access to the communications session 100, then the session manager 401 sends an "invite" session call to Participant D 404d. If Participant D 404d accepts the invitation, then the session manager 401 updates the participant list 322, or roster 322, to include Participant D 404d. The session manager 401 provides Participant D 404d with the then current participant list 322, including Participant A 404a, Participant B 404b, and Participant C 404c, through the original "invite" session call. Once a signaling session is established between the session manager 401 and Participant D 404d, then the current participant list 322 is propagated to Participant D 404d and connections are established. Other potential scenarios are discussed below with reference to FIGS. 6-13.

Figure 5:
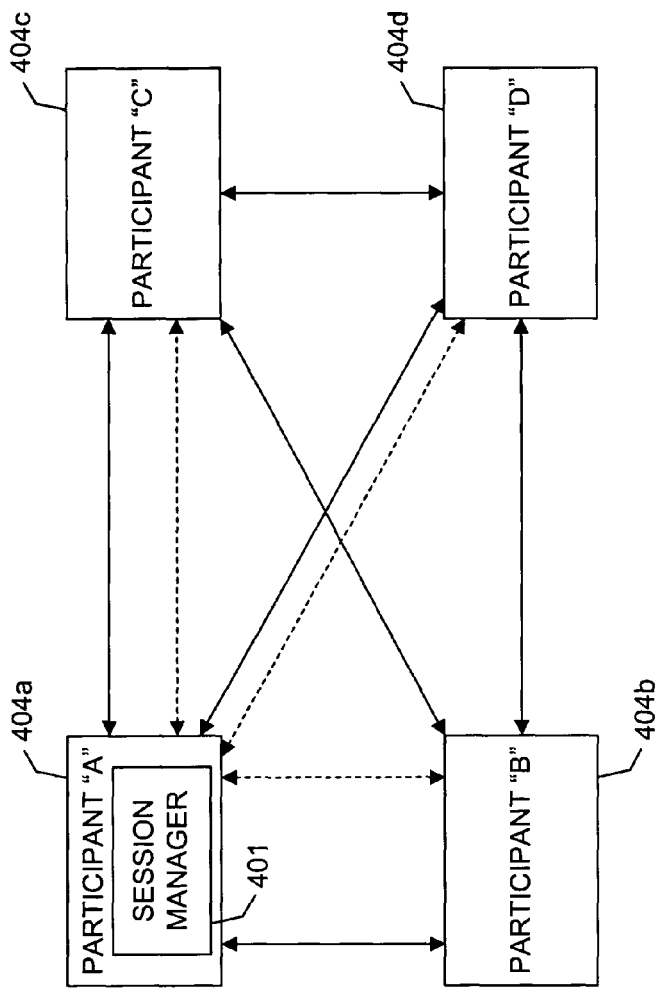
FIG. 5 displays a block diagram logical representation illustrating a multiparty communications session with a communications session manager associated with a participant in accordance with an exemplary embodiment of the present invention.

FIG. 5 displays a block diagram logical representation illustrating a multiparty communications session 100 with a communications session manager 401 associated with a participant 404 in accordance with an exemplary embodiment of the present invention. Similar to FIG. 4, the multiparty communications session 100 illustrated in FIG. 5 comprises a session manager 401 and several participants 404, including Participant A 404a through Participant D 404d. Likewise, participants 404 comprise respective communication devices 106 and software domains 300 (i.e., including, but not limited to, respective user agents 107) necessary to establish a connection to the multiparty session 100, to designate a new session manager 401 if required, and to perform task and methods described herein. The number of participants 404 within a multiparty session 100 may vary depending on how many participants 404 join a particular multiparty session 100, therefore, the multiparty session 100 is not limited to four participants 404 as shown in FIG. 5.

In an exemplary embodiment of the present invention, the session manager 401 resides with a designated participant 404. For example and not limitation, the session manager 401 may be associated with Participant A 404a, as shown in FIG. 5. Therefore, each participant 404 connects communicatively to the session manager 401 (i.e., to Participant A 404a). Such a configuration eliminates the necessity of a central server or MCU to manage the participant list 322.

The dashed-lines between Participant A 404a, Participant B 404b, Participant C 404c, and Participant D 404d represent session management calls which are directed to the session manager 401 residing with Participant A 404a. Additionally, the solid-lines between each of the participants 404 represent media calls. Except with respect to the location of the session manager 401, the multiparty session 100 illustrated in FIG. 5 substantially resembles the multiparty session 100 described above with reference to FIG. 4. Accordingly, no further description is necessary herein.

Figure 6A:
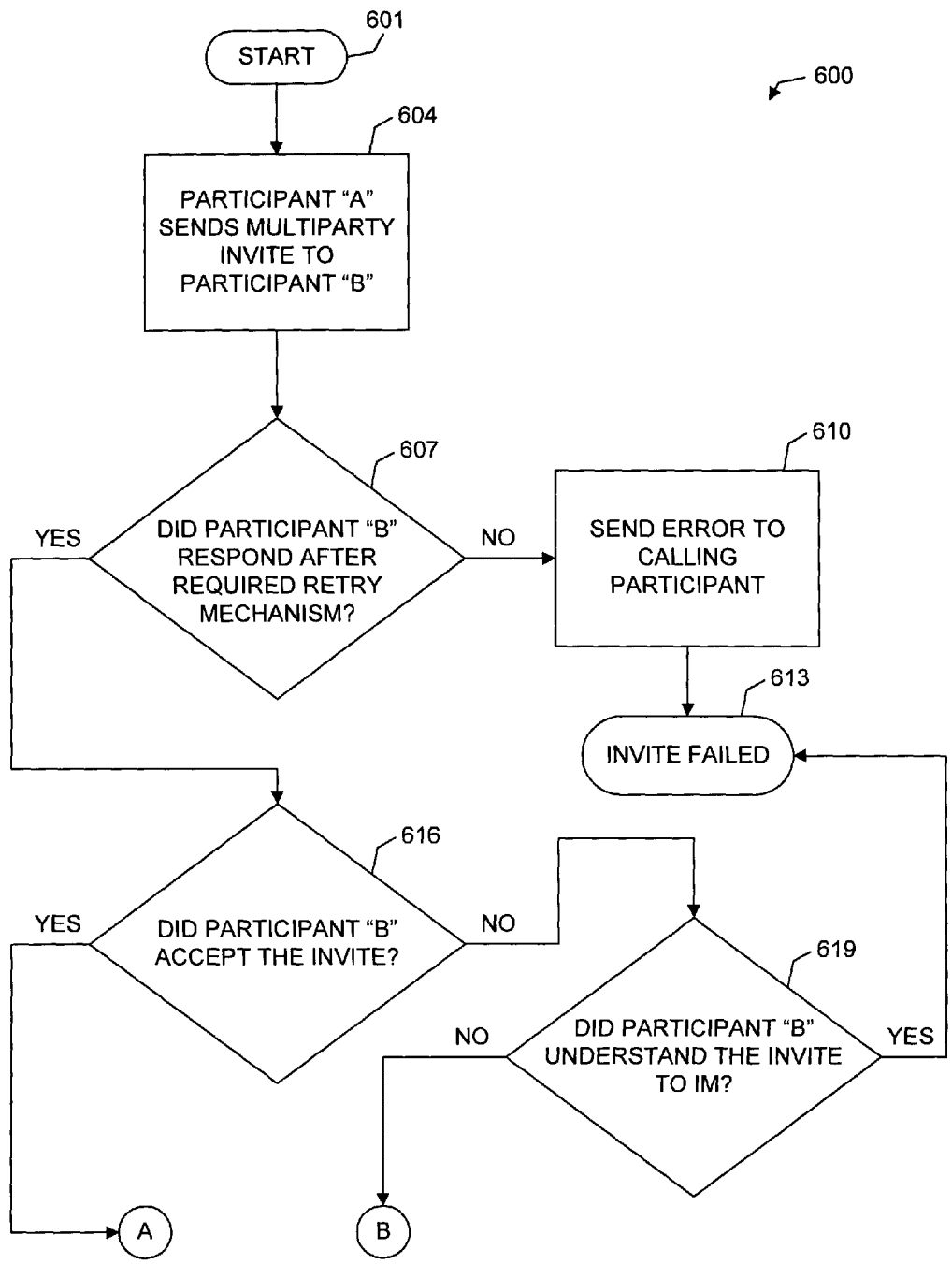
FIGS. 6A-6B display a flowchart representation of a method of creating a new communications session between participants thereof from the view of an inviting participant in accordance with an exemplary embodiment of the present invention.
Figure 6B:
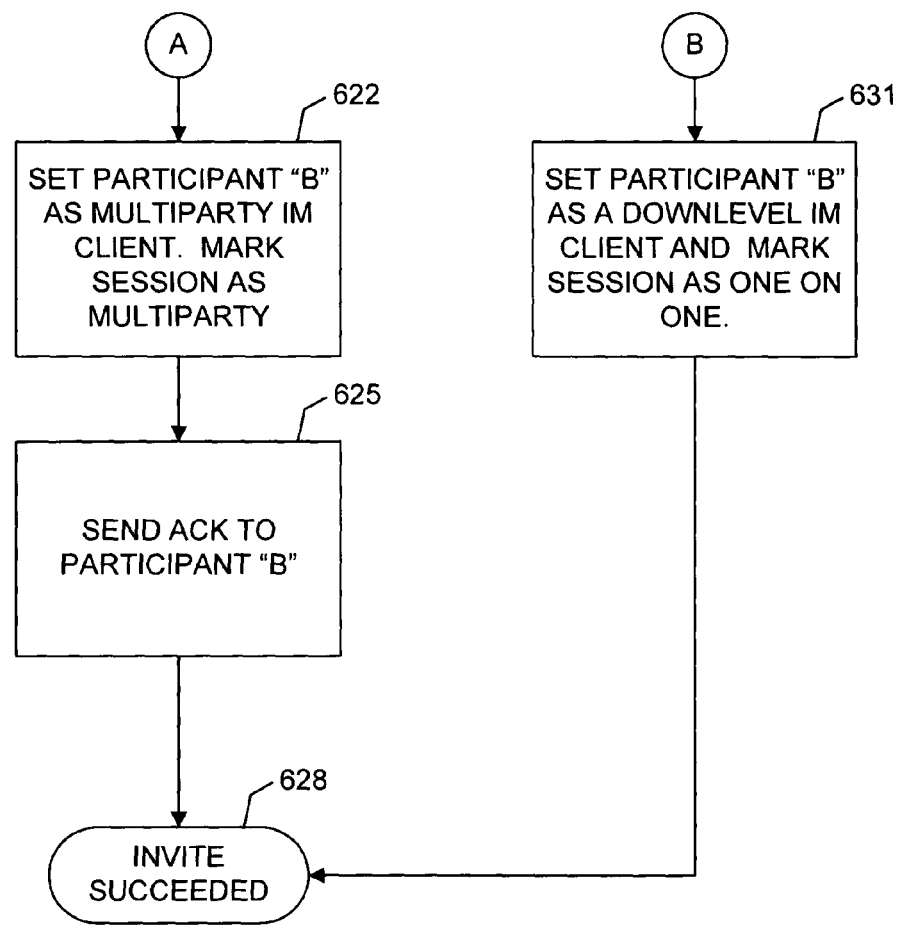

FIGS. 6A-6B display a flowchart representation of a method 600 of creating a new communications session 100 between participants 404 thereof from the view of an inviting participant in accordance with an exemplary embodiment of the present invention. The creation of a new communications session 100 requires at least two participants 404 where no communications session 100 existed previously between the participants 404 or where a new communications session 100 is desired regardless of any other existing communications session 100. Preferably, a communications session 100 should be established using Session Initiation Protocol (SIP) instead of simply sending instant messages between participants 404 using a MESSAGE primitive or equivalent thereof under a different protocol. One skilled in the art will recognize that instant messaging is only one instance of multiparty conferencing. The present invention may extend to instant messaging and other types of multiparty conferencing such as, but not limited to, audio and video conferencing. The establishment of a communications session 100 using Session Initiation Protocol (SIP) provides better session control and greater flexibility than the use of instant messaging because additional session information can be exchanged during the creation of the communications session 100. To provide for user agents 107 that do not support the INVITE message (also sometimes referred to herein as "dumb user agents"), the communications session 100 must provide for successful degradation (i.e., providing support for devices that are not capable of multiparty communication).

For the purposes of the description herein with reference to FIGS. 6A-6B, no communications session 100 currently exists between Participant A 404a and Participant B 404b, and Participant A 404a performs the functions of the session manager 401. After starting at step 601, Participant A 404a (i.e., the session manager 401) proceeds to step 604 where the session manager 401 sends a multiparty INVITE message to Participant B 404b. At step 607, the session manager 401 determines whether Participant B 404b responded to the INVITE message in accordance with the required retry mechanism. The retry mechanism, preferably, designates how much time is to elapse before the session manager 401 evaluates whether Participant B 404b responded to the INVITE message. The retry mechanism may also designate how many times the session manager 401 should send a multiparty INVITE message to Participant B 404b, before evaluating if a response was received from Participant B

404b. If Participant B 404b does not respond in accordance with the required retry mechanism, then the session manager 401 proceeds to step 610 where it sends an INVITE error to Participant A 404a (i.e., in Participant A's 404a role as the calling participant). Next, the session manager 401 ceases operation in accordance with method 600 at step 613 due to failure of the INVITE from the session manager 401 to Participant B 404b.

If, at step 607, the session manager 401 receives a response from Participant B 404b in accordance with the required retry mechanism, the session manager 401 proceeds to step 616 where it determines whether Participant B 404b has accepted the INVITE by analyzing the content of the received response. If the session manager 401 determines that Participant B 404b did not accept the INVITE (i.e., for example and not limitation, due to an error or rejection), then the session manager 401 proceeds to step 619 as described below, otherwise the session manager 401 proceeds to step 622 of the method 600.

At step 619, the session manager 401 determines whether Participant B 404b understood the multiparty INVITE message by examining the received response from Participant B 404b to ascertain if the appropriate data thereof indicates that Participant B 404b supports multiparty sessions 100. If session manager 401 determines that Participant B 404b understood the multiparty INVITE message, then the session manager 401 terminates operation according to method 600 at step 613, because Participant B 404b declined the invitation and, therefore, the INVITE from Participant A 404a to Participant B 404b failed. If, however, the session manager 401 determines that Participant B 404b did not understand the multiparty INVITE message, then the session manager 401 proceeds to step 631 where the session manager 401 establishes and designates a one-on-one communications session 100 between Participant A 404a and Participant B 404b with Participant B 404b being identified as a downlevel client (i.e., a dumb user agent). After the session between Participant A 404a and Participant B 404b is established, the session manager 401 ceases operation in accordance with method 600 at step 628, as a consequence of the successful completion of the INVITE.

If, however, at step 616, the session manager 401 determines that Participant B 404b accepted the INVITE, then the session manager 401 establishes a multiparty session 100 between Participant A 404a and Participant B 404b at step 622. By accepting the multiparty INVITE, Participant B 404b has indicated that it understood the multiparty INVITE message. Accordingly, the session manager 401 identifies Participant B 404b as a multiparty client and designates the communications session 100 as a multiparty session 100. Next, at step 625, the session manager 401 sends an acknowledgement (ACK) to Participant B 404b indicating that the communications session 100 has been established. The session manager 401 terminates operation in accordance with method 600 at step 628.

Figure 7A:
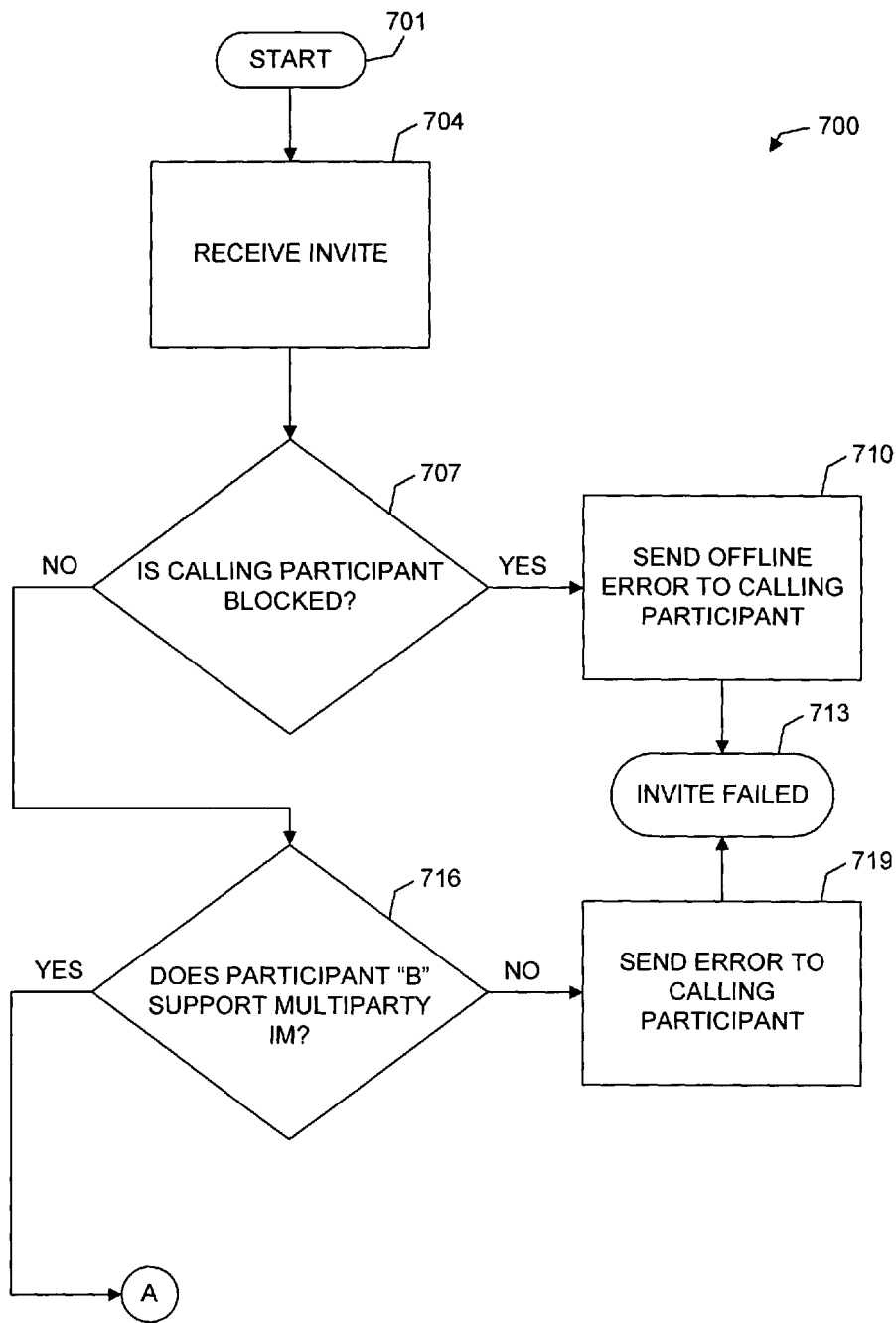
FIGS. 7A-7B display a flowchart representation of a method of creating a new communications session between participants thereof from the view of an invited participant in accordance with an exemplary embodiment of the present invention.
Figure 7B:
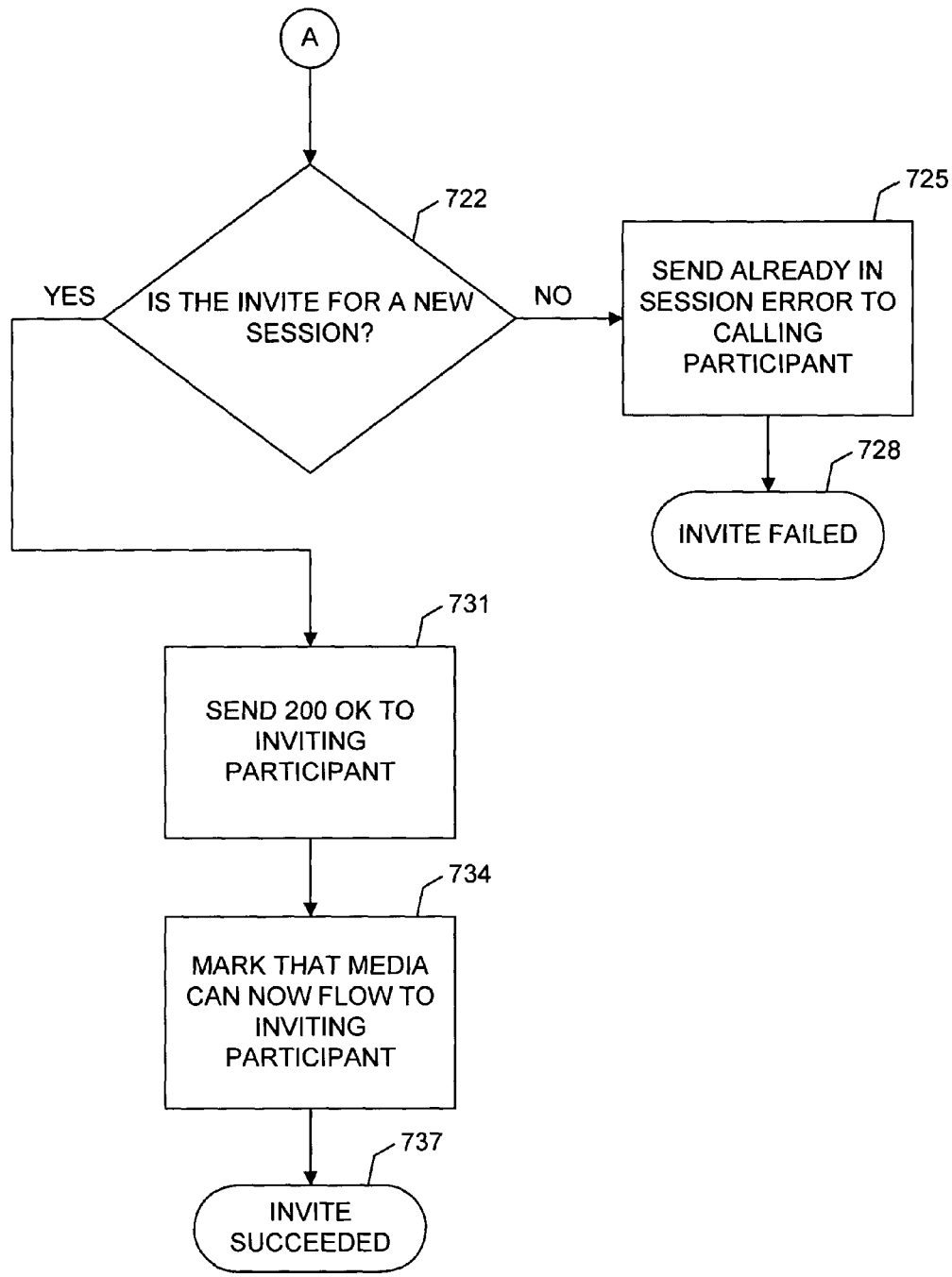

FIGS. 7A-7B display a flowchart representation of a method 700 of creating a new communications session 100 between participants 404 thereof from the view of an invited participant 404 in accordance with an exemplary embodiment of the present invention. For purposes of the following description and similar to the scenario described above with respect to FIGS. 6A-6B, no communications session 100 currently exists between Participant A 404a and Participant B 404b, and Participant A 404a performs the functions of the session manager 401.

After starting at step 701, Participant B 404b receives a multiparty INVITE message from the session manager 401 at step 704 of method 700. At step 707, Participant B 404b determines whether it is blocking communications from the session manager 401 (i.e., Participant A 404a as the calling participant). If Participant B 404b determines that it is blocking communications from the session manager 401, Participant B 404b proceeds to step 710 where it sends an offline error to the session manager 401. Participant B 404b ceases operation in accordance with method 700 at step 713, due to the failure of the INVITE received from session manager 401 by Participant B 404b. One skilled in the art will recognize that the offline error may be used to mask that Participant B 404b is blocking communication from other participants 404. Alternatively, Participant B 404b may send different error messages or not send an error message at all.

If, however, at step 707 Participant B 404b determines that it is not blocking communications with the session manager 401, then Participant B 404b proceeds to step 716 where Participant B 404b determines whether it supports multiparty sessions 100. If Participant B 404b determines that it does not support multiparty sessions 100, then Participant B 404b proceeds to step 719 where Participant B 404b sends an error message to the session manager 401. Participant B 404b then proceeds to step 713 of method 700, due to failure of the INVITE received from the session manager 401.

If, at step 716, Participant B 404b determines that it supports multiparty sessions 100, then Participant B 404b proceeds to step 722 of method 700 where it determines whether the INVITE message seeks to establish a new communications session 100. If the INVITE message does not seek to establish a new communications session 100, then Participant B 404b proceeds to step 725 where it sends an already-in-session error to the session manager 401. Participant B 404b then ceases operation in accordance with method 700 at step 728, due to failure of the INVITE received from the session manager 401. Otherwise, if the INVITE message seeks to establish a new communications session 100, then Participant B 404b advances to step 731 where Participant B 404b sends a 200 OK message to the session manager 401 (i.e., to Participant A 404a in its capacity as the inviting participant). Then, at step 734, the session manager 401 designates that media may be communicated from Participant B 404b to Participant A 404a. Participant B 404b then ends operation in accordance with method 700 at step 737.

Table 2 illustrates an exemplary call flow (i.e., using SIP) for Participant A 404a (i.e., serving as the session manager 401) inviting Participant B 404b into a new communications session 100, where Participant B 404b supports multiparty sessions 100. In Table 2, the "EndPoints" header field provides Participant B 404b with a list of participants 404 that Participant B 404b must connect with in order to properly join the communications session 100. If Participant B 404b already has a connection to a participant 404 within the list of participants 404, then no further connection is necessary. Further, Participant B 404b need not connect to itself, if Participant B 404b is within the list of participants 404. Also in Table 2, the "RM" header field indicates the location of the session manager 401. The RM header field is not part of the basic Session Initiation Protocol. The present invention introduces a layer of functionality on top of the Session Initiation Protocol to assist in designating and electing a participant 404 as the session manager 401. Additionally in Table 2, the "200 OK" header field contains the SIP response code (i.e., 200) and the reason phrase (i.e., OK) which indicates whether a participant 404 has accepted a message or request. Further, the "Require" header field indicates that the invited participant 404b must support multiparty sessions 100 in order to accept the INVITE.

TABLE 2

| | |
|---|---|
| A->B: | INVITE sip:B@microsoft.com SIP/2.0 |
| | To: sip:B@microsoft.com |
| | From: Participant A <sip:A@microsoft.com> |
| | Call-ID: 1234567890 |
| | CSeq: 1 INVITE |
| | Contact: sip:A@microsoft.com |
| | Supported: multiparty |
| | EndPoints: Participant A <sip:A@microsoft.com> |
| | RM: sip:A@microsoft.com |
| | Content-Type: application/SDP |
| | Content-Length: XXX |
| | . . . |
| | m = message 5060 sip sip:A@microsoft.com |
| | . . . |
| B->A: | SIP/2.0 200 OK |
| | To: sip:B@microsoft.com |
| | From: Participant A <sip:A@microsoft.com> |
| | Call-ID: 1234567890 |
| | CSeq: 1 INVITE |
| | Contact: sip:B@microsoft.com |
| | Require: multiparty |
| | Content-Length: XXX |
| | . . . |
| | m = message 5060 sip sip:B@microsoft.com |
| | . . . |
| A->B: | ACK sip:B@microsoft.com SIP/2.0 |
| | To: sip:B@microsoft.com |
| | From: sip:A@microsoft.com |
| | Call-ID: 1234567890 |
| | CSeq: 1 ACK |
| | Content-Length: 0 |

Table 3 illustrates a call flow (i.e., using SIP) for the session manager 401 inviting Participant B 404b into a new communications session 100, where Participant B 404b does not support multiparty sessions 100. Although Participant B 404b sends a "200 OK" header in the call flow, the "Required" header field is absent from the SIP message, thereby indicating that Participant B 404b does not support multiparty sessions 100. When the session manager 401 receives the "200 OK" SIP message, the session manager 401 determines whether Participant B 404b supports multiparty conferencing. If Participant B 404b, as in this example, does not support multiparty conferencing, then the session manager 401 establishes a one-on-one communications session 100 between Participant A 404a and Participant B 404b.

TABLE 3

| | |
|---|---|
| A->B: | INVITE sip:B@microsoft.com SIP/2.0 |
| | To: sip:B@microsoft.com |
| | From: Participant A <sip:A@microsoft.com> |
| | Call-ID: 1234567890 |
| | CSeq: 1 INVITE |
| | Contact: sip:A@microsoft.com |
| | Supported: multiparty |
| | EndPoints: Participant A <sip:A@microsoft.com> |
| | RM: sip:A@microsoft.com |
| | Content-Type: application/SDP |
| | Content-Length: XXX |
| | . . . |
| | m = message 5060 sip sip:A@microsoft.com |
| | . . . |
| B->A: | SIP/2.0 200 OK |
| | To: sip:B@microsoft.com |
| | From: Participant A <sip:A@microsoft.com> |
| | Call-ID: 1234567890 |
| | CSeq: 1 INVITE |
| | Contact: sip:B@microsoft.com |
| | Content-Length: XXX |
| | . . . |
| | m = message 5060 sip sip:b@microsoft.com |
| | . . . |

Figure 8A:
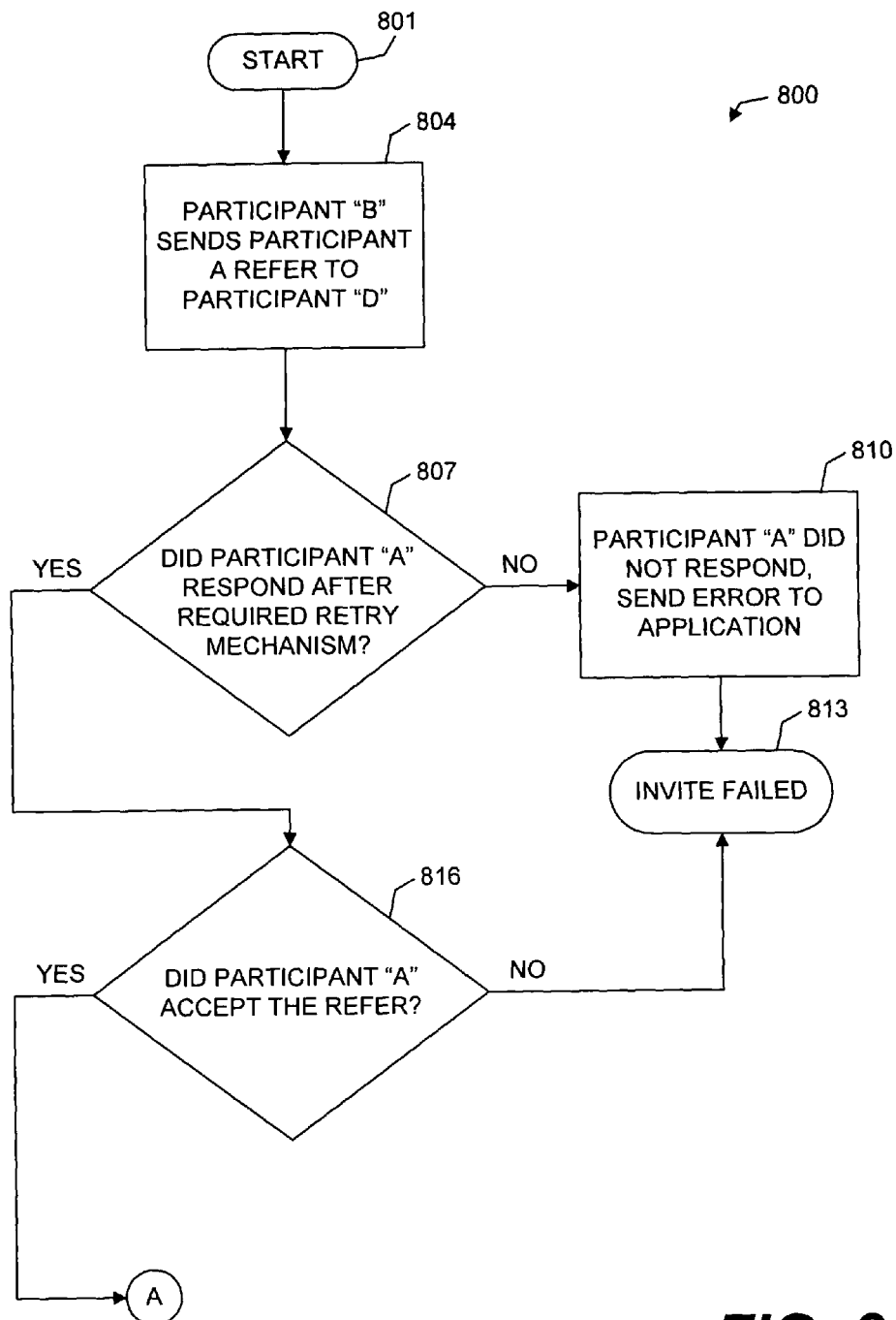
FIGS. 8A-8B display a flowchart representation of a method of inviting a new participant into an already established communications session from the view of a referring participant in accordance with an exemplary embodiment of the present invention.
Figure 8B:
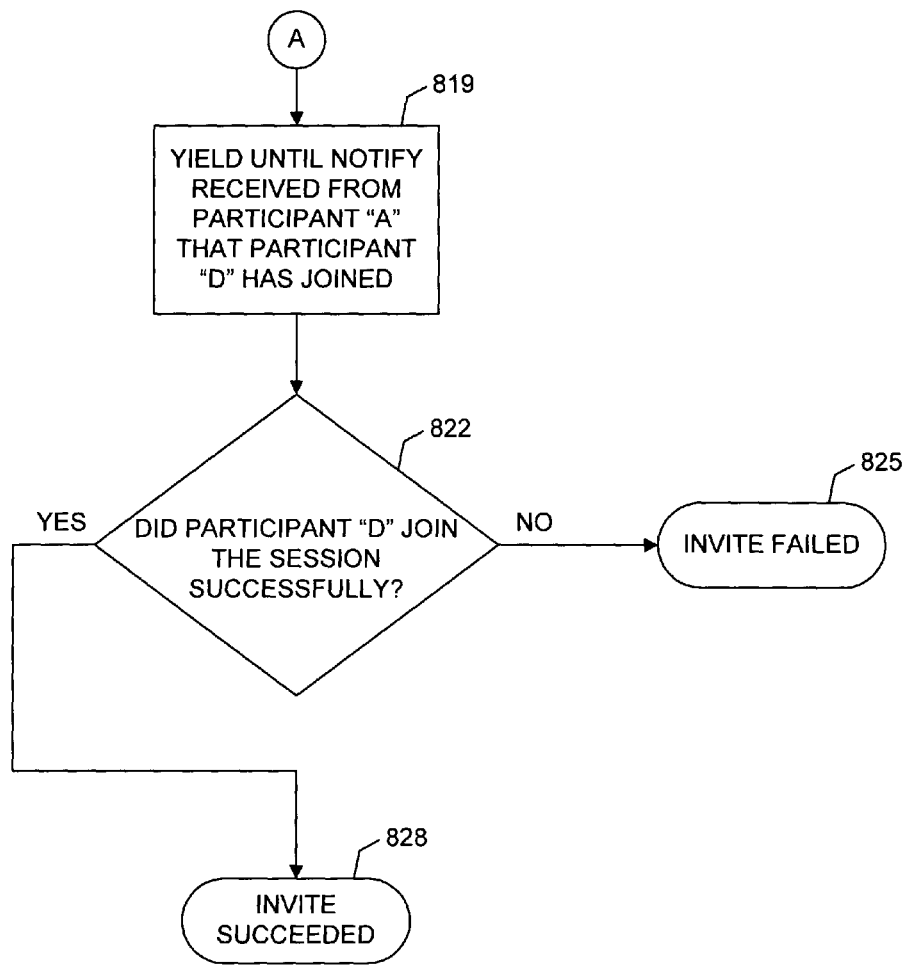

FIGS. 8A-8B display a flowchart representation of a method 800 of inviting a new participant 404 into an already established communications session 100 from the view of a referring participant 404 in accordance with an exemplary embodiment of the present invention. Once a communications session 100 is initialized as described above with reference to FIGS. 6A, 6B, 7A, and 7B, additional participants 404 may be invited into the existing communications session 100 by the session manager 401. To prevent the possibility of multiple participants 404 joining a communications session 100 at the same time and receiving different lists of participants 404 (i.e., and creating a disjointed communications session 100), all participants 404 joining the communications session 100 must obtain the list of participants 404 from the session manager 401. For example, when Participant B 404b within an existing communications session 100 desires to invite Participant C 404c into the communications session 100, Participant B 404b must contact the session manager 401 and "refer" the session manager 401 to Participant C 404c. The session manager 401 then "invites" Participant C 404c into the communications session 100 as described below.

For the purposes of FIGS. 8A-8B, Participant A 404a, Participant B 404b, and Participant C 404c are members of a current communications session 100 with Participant A 404a acting as the session manager 401. If Participant B 404b wants Participant D 404d to join the communications session 100, then Participant B 404b must request that the session manager 401 (i.e., Participant A 404a) send an INVITE message to Participant D 404d in order to "invite" Participant D 404d to join the on-going communications session 100. Such a request is accomplished by Participant B 404b sending an appropriate REFER message to the session manager 401.

After starting at step 801, Participant B 404b advances to step 804 of method 800 where Participant B 404b sends an appropriate REFER message to the session manager 401 on behalf of Participant D 404d in order to request that the session manager 401 invite Participant D 404d to join the communications session 100. Next, at step 807, Participant B 404b determines whether the session manager 401 responded in accordance with a required retry mechanism by evaluating whether a response was received from the session manager 401. If the session manager 401 did not respond in accordance with the required retry mechanism, Participant B 404b proceeds to step 810 where Participant B 404b receives an error message from the session manager 401 signifying that the session manager 401 did not respond to the REFER message. Participant B 404b ceases operation in accordance with method 800 at step 813, due to the failure of the REFER received by the session manager 401 from Participant B 404b. If, however, at step 807, Participant B 404b receives an appropriate response from the session manager 401 in accordance with the required retry mechanism, then Participant B 404b advances to step 816 where Participant B 404b determines whether the session manager 401 accepted the REFER by evaluating the appropriate data in the response message from the session manager 401. If Participant B 404b determines that the session manager 401 did not accept the REFER, then Participant B 404b terminates operation in accordance with method 800 at step 813, due to the failure of the REFER received by the session manager 401 from Participant B 404b. If, at step 816, Participant B 404b determines that the session manager 401 accepted the REFER, then Participant B 404b proceeds to step 819 where Participant B 404b yields until a NOTIFY message is received from the session manager 401 indicating that Participant D 404d has successfully joined the communications session 100. Such a notification is not required for communication between the participants 404 to occur, but should be implemented to ensure conformance with the established standard.

Next, Participant B 404*b* proceeds to step 822 where the session manager 401 determines whether Participant D 404*d* successfully joins the communications session 100 by evaluating the appropriate response/acknowledgment messages from Participant D 404*d*. If the session manager 401 determines that Participant D 404*d* did not successfully join the communications session 100, then Participant B 404*b* terminates operation in accordance with method 800 at step 825, due to the failure of the INVITE from the session manager 401 to Participant D 404*d*. Otherwise, if the session manager 401 determines that Participant D 404*d* successfully joined the communication session 100, then Participant B 404*b* ends operation in accordance with method 800 at step 828. Participant D 404*d* officially joins the communications session 100 when it establishes media sessions with all of the participants 404 currently within the communications session 100. While every participant 404 possesses a participant list 322 within the communications session 100, only the participant 404 acting as the session manager 401 (i.e., Participant A 404*a*) provides the list of participants 404 to Participant D 404*d* during the INVITE.

Figure 9A:
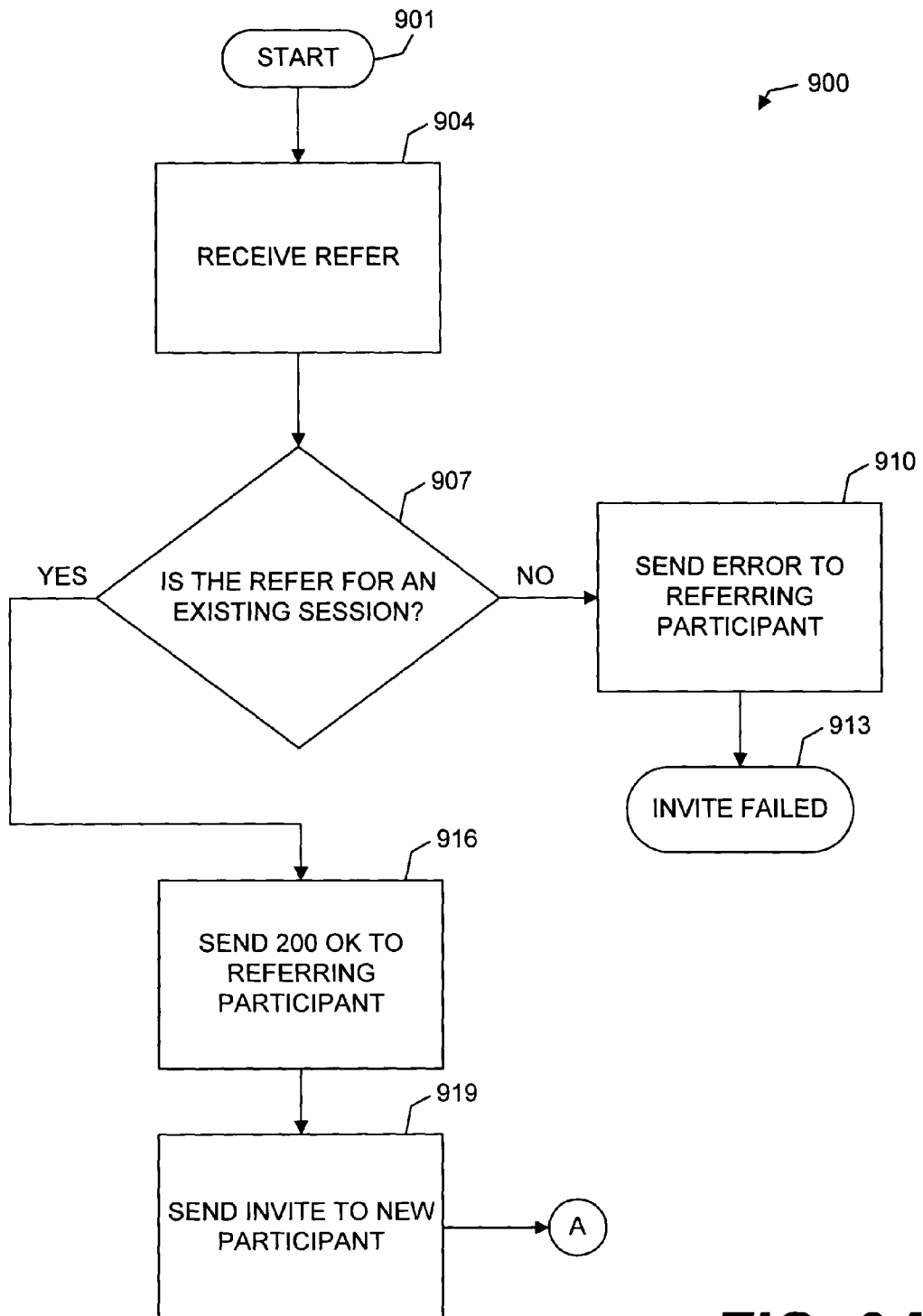
FIGS. 9A-9B display a flowchart representation of a method of inviting a new participant into an already established communications session from the view of the session manager in accordance with an exemplary embodiment of the present invention.
Figure 9B:
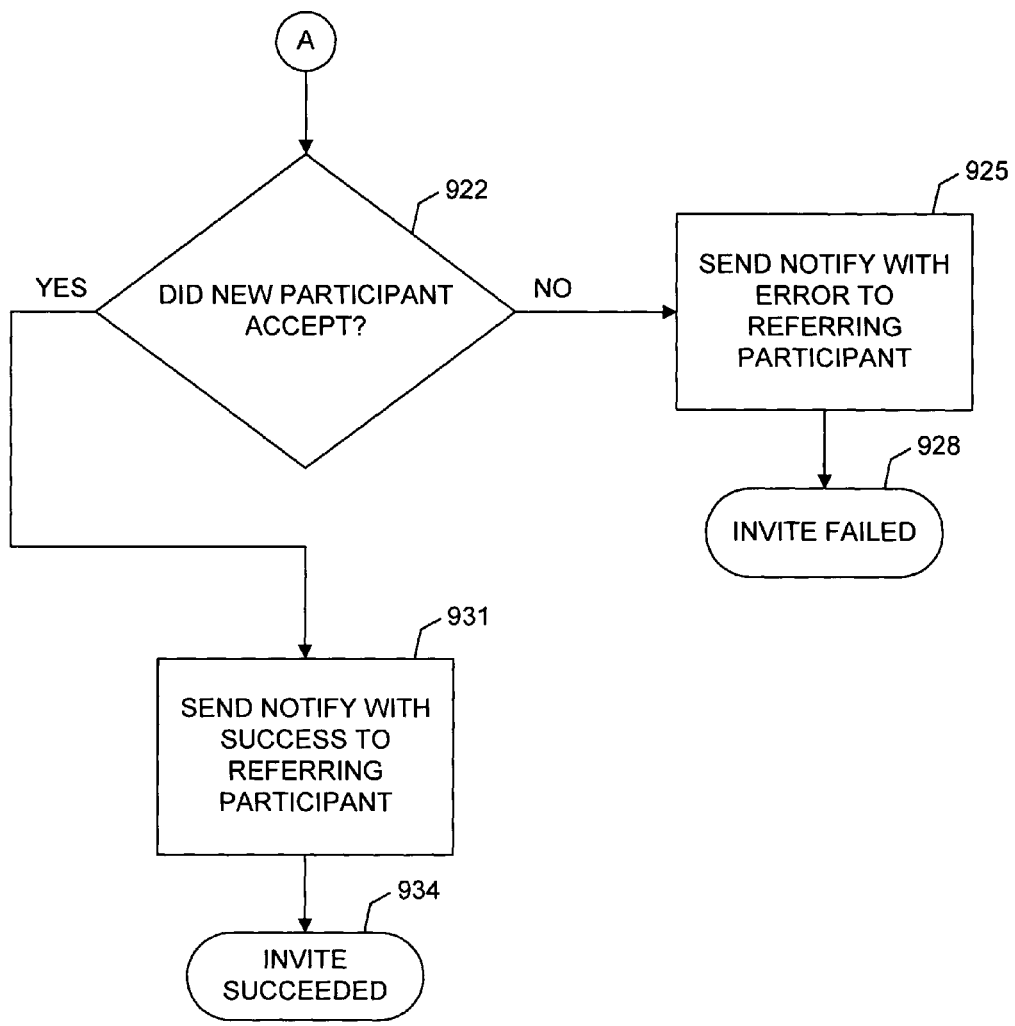

FIGS. 9A-9B display a flowchart representation of a method 900 of inviting a new participant 404 into an already established communications session 100 from the view of the session manager 401 in accordance with an exemplary embodiment of the present invention. Similar to the description described above for FIGS. 8A-8B, Participant A 404*a*, Participant B 404*b*, and Participant C 404*c* are members of a current communications session 100 with Participant A 404*a* performing the functions of the session manager 401. If Participant B 404*b* wants Participant D 404*d* to join the communications session 100, then Participant B 404*b* must "refer" the session manager 401 to send an INVITE message to Participant D 404*d*. The session manager 401 receives the REFER message from Participant B 404*b* and sends an INVITE message to Participant D 404*d*.

After starting at step 901, the session manager 401 proceeds to step 904 of method 900 where it receives a REFER message from Participant B 404*b* referring Participant D 404*d* to a communications session 100. Next, the session manager 401 advances to step 907 where the session manager 401 determines whether the REFER message received from Participant B 404*b* is for an existing communications session 100. If the session manager 401 determines that the REFER message from Participant B 404*b* is not for an existing communications session 100, then the session manager 401 proceeds to step 910 where the session manager 401 sends an error message to Participant B 404*b* indicating that the REFER message is for a nonexistent communications session 100. The session manager 401 then ends operation in accordance with the method 900 at step 913, due to the failure of the REFER by Participant B 404*b* to the session manager 401. If, however, at step 907, the session manager 401 determines that the REFER message received from Participant B 404*b* is for an existing communications session 100, then the session manager 401 proceeds to step 916 where the session manager 401 sends a 200 OK message to Participant B 404*b*, indicating receipt of a valid REFER.

Next, at step 919, the session manager 401 sends an INVITE message to Participant D 404*d*. The session manager 401 then proceeds to step 922 of method 900 where the session manager 401 determines whether Participant D 404*d* accepted the INVITE by evaluating any responses from Participant D 404*d*. If the session manager 401 determines that Participant D 404*d* did not accept the INVITE, then the session manager advances to step 925 where the session manager 401 sends a NOTIFY message with an error message to Participant B 404*b* (i.e, the referring participant). The session manager 401 then ends operation in accordance with method 900 at step 928, due to the failure of the INVITE from the session manager 401 to Participant D 404*d*.

If, however, at step 922, the session manager 401 determines that Participant D 404*d* accepted the INVITE, then the session manager 401 proceeds to step 931 where the session manager 401 sends a NOTIFY message with a success message to Participant B 404*b*, indicating that Participant D 404*d* has successfully joined the communications session 100. The session manager 401 then ends operation in accordance with method 900 at step 934.

Figure 10A:
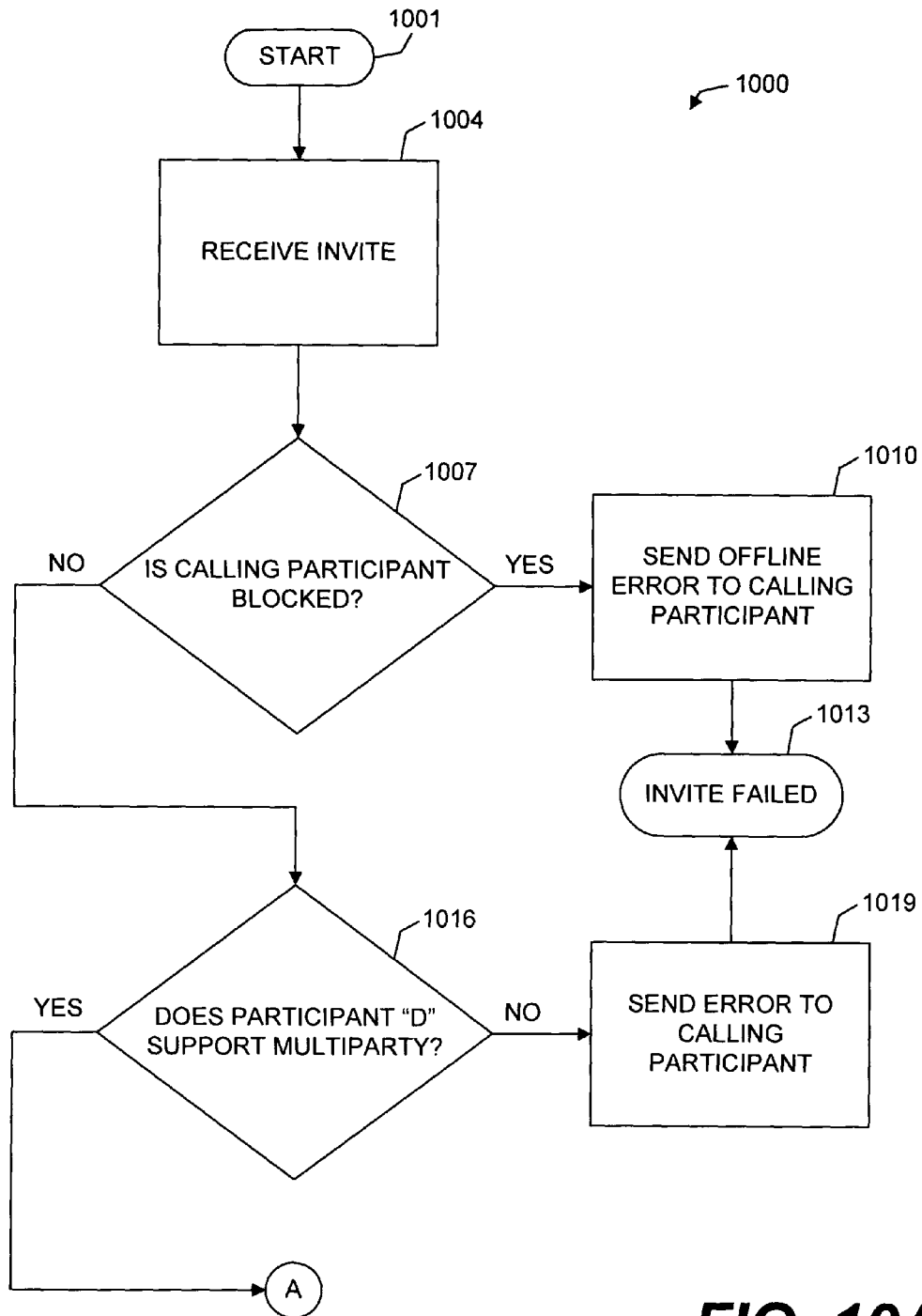
FIGS. 10A-10C display a flowchart representation of a method of inviting a new participant into an already established communications session from the view of an invited participant in accordance with an exemplary embodiment of the present invention.
Figure 10B:
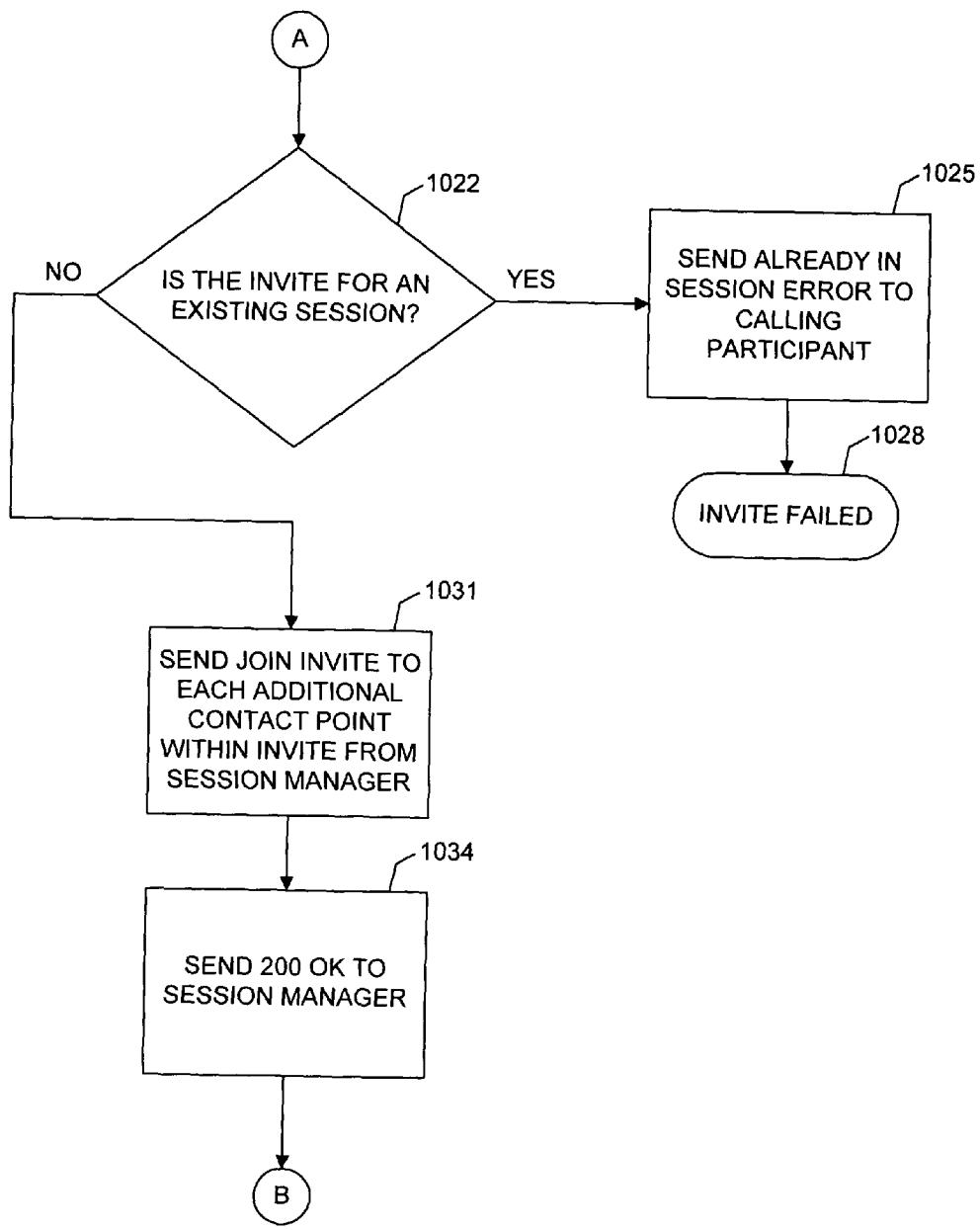
Figure 10C:
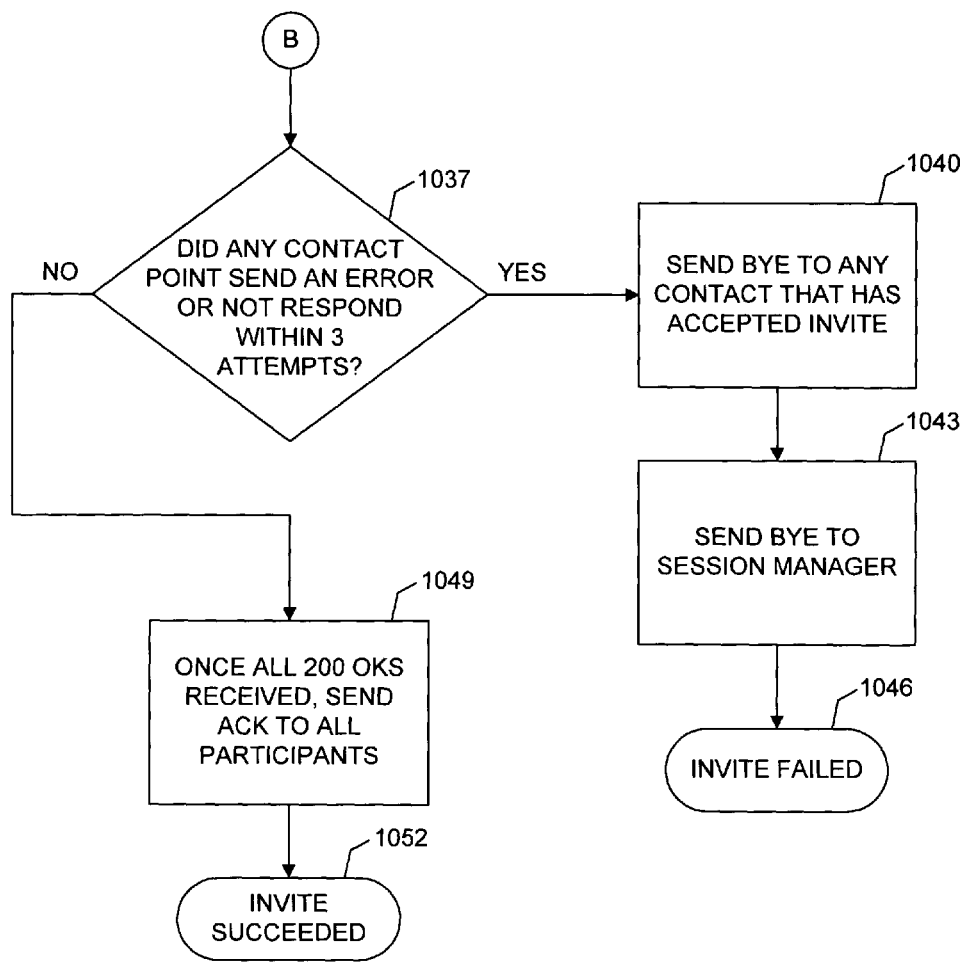

FIGS. 10A-10C display a flowchart representation of a method 1000 of inviting a new participant 404 into an already established communications session 100 from the view of an invited participant 404 in accordance with an exemplary embodiment of the present invention. Similar to the description above for FIGS. 8A-8B and 9A-9B, Participant A 404*a*, Participant B 404*b*, and Participant C 404*c* are members of a current communications session 100 with Participant A 404*a* performing the functions of the session manager 401. If Participant B 404*b* wants Participant D 404*d* to join the communications session 100, then Participant B 404*b* must "refer" the session manager 401 to send an INVITE message to Participant D 404*d*. Participant D 404*d* must properly accept the INVITE from the session manager 401 in order to join the communications session 100.

After starting at step 1001, Participant D 404*d* proceeds to step 1004 of method 1000 where it receives an INVITE message to a communications session 100 from the session manager 401. Next, at step 1007, Participant D 404*d* determines whether it is blocking communications from the session manager 401. If Participant D 404*d* determines that it is blocking communications from the session manager 401, then Participant D 404*d* proceeds to step 1010 where it sends an offline error to the session manager 401. Participant D 404*d* then terminates operation in accordance with method 1000 at step 1013, due to the failure of the INVITE from the session manager 401 to Participant D 404*d*. If, however, at step 1007, Participant D 404*d* determines that it is not blocking communications from the session manager 401, then Participant D 404*d* proceeds to step 1016 where Participant D 404*d* determines whether it supports multiparty sessions 100. If Participant D 404*d* determines that it cannot support a multiparty session 100, then Participant D 404*d* proceeds to step 1019 where it sends an error message to the session manager 401. Participant D 404*d* then ends operation in accordance with method 1000 at step 1013, due to the failure of the INVITE from the session manager 401 to Participant D 404*d*. If Participant D 404*d* cannot support multiparty sessions 100, then Participant D 404*d* is considered a dumb user agent and, therefore, can only support a one-on-one communications session 100.

If, however, at step 1016, Participant D 404*d* determines that it can support multiparty sessions 100, then Participant D 404*d* proceeds to step 1022 where Participant D 404*d* determines whether the INVITE message from the session manager 401 is for an existing multiparty session 100. If Participant D 404*d* determines that the INVITE message from the session manager 401 is for an existing multiparty session 100, then Participant D 404*d* advances to step 1025 where Participant D 404*d* sends a failure response to the session manager 401, and the session manager 401, in turn, sends an error message to Participant B 404*b* (i.e., the referring participant 404) indicating that Participant D 404*d* is already in the communications session 100. Participant D 404*d* ends operation in accordance with method 1000 at step 1028, due to the failure of the INVITE from the session manager 401 to Participant D 404d. Otherwise, if at step 1022, Participant D 404d determines that the INVITE message from the session manager 401 is not for an existing communications session 100, then Participant D 404d advances to step 1031 where Participant D 404d sends a join INVITE message to each participant 404 (i.e., also referred to herein as "contact point") listed in the original INVITE message from the session manager 401. Next, Participant D 404d proceeds to step 1034 where Participant D 404d sends a 200 OK message to the session manager 401.

Participant D 404d then advances to step 1037 where Participant D 404d determines whether any contact point returned an error to the join INVITE or did not respond within three attempts to connect, by evaluating the responses from the other participants 404. One skilled in the art will recognize that the number of attempts may be altered as desired and may depend on the protocol in use. If Participant D 404d determines that a contact point returned an error to the join INVITE or did not respond within three attempts to connect, then Participant D 404d proceeds to step 1040 where Participant D 404d sends a BYE message to any contact point that has accepted the join INVITE. Next, at step 1043, Participant D 404d sends a BYE message to the session manager 401. Participant D 404d then terminates in accordance with method 1000 at step 1046, due to the failure of the INVITE from the session manager 401 to Participant D 404d.

If, however, at step 1037, Participant D 404d determines that every contact point responded without error, then Participant D 404d advances to step 1049 where Participant D 404d sends an ACK message to Participant A 404a, Participant B 404b, and Participant C 404c after receiving all of the 200 OK messages from the participants 404 regarding the join INVITE message. Participant D 404d ends operation in accordance with method 1000 at step 1052.

Figure 11A:
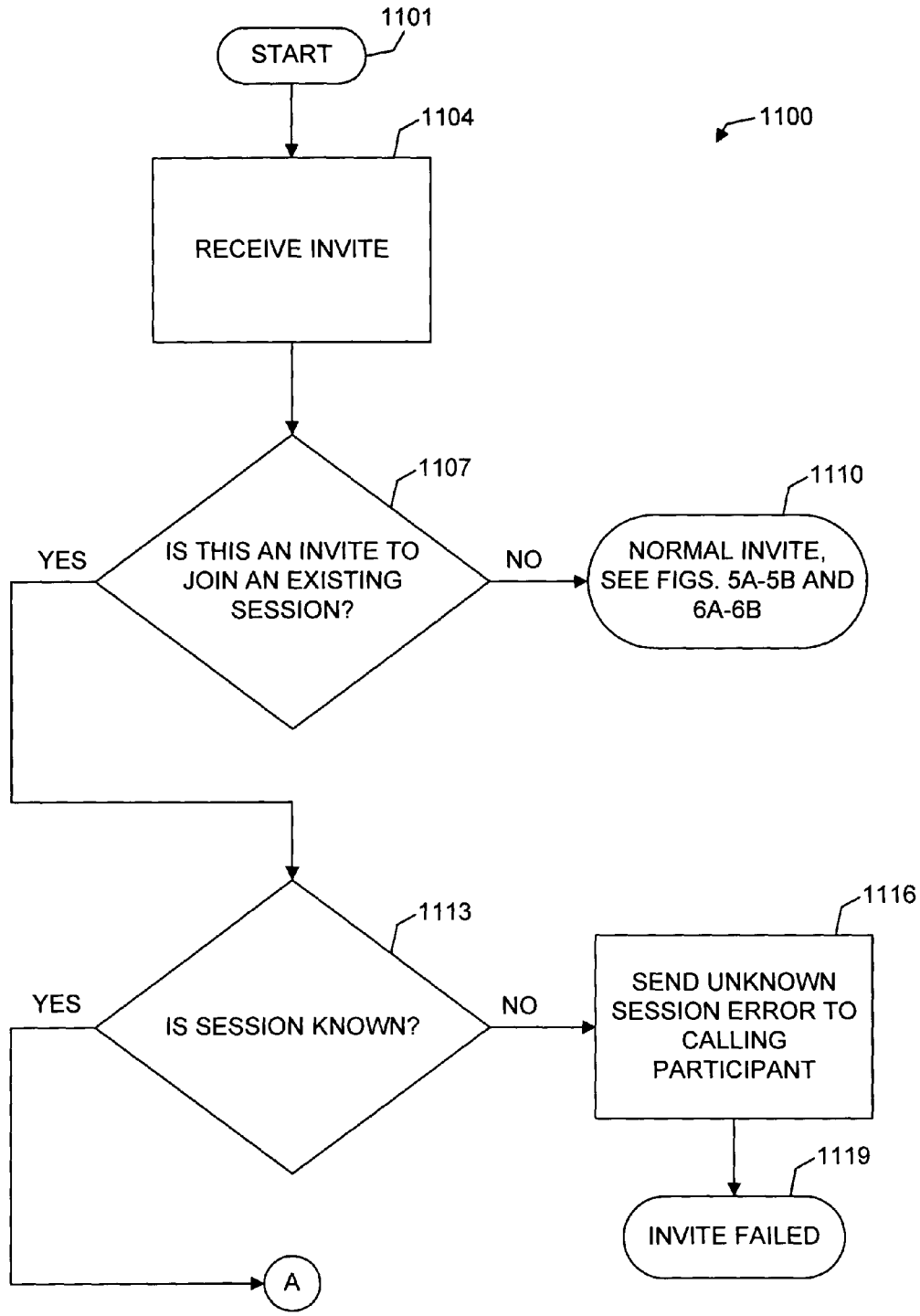
FIGS. 11A-11B display a flowchart representation of a method of inviting a new participant into an already established communications session from the view of an existing participant in accordance with an exemplary embodiment of the present invention.
Figure 11B:
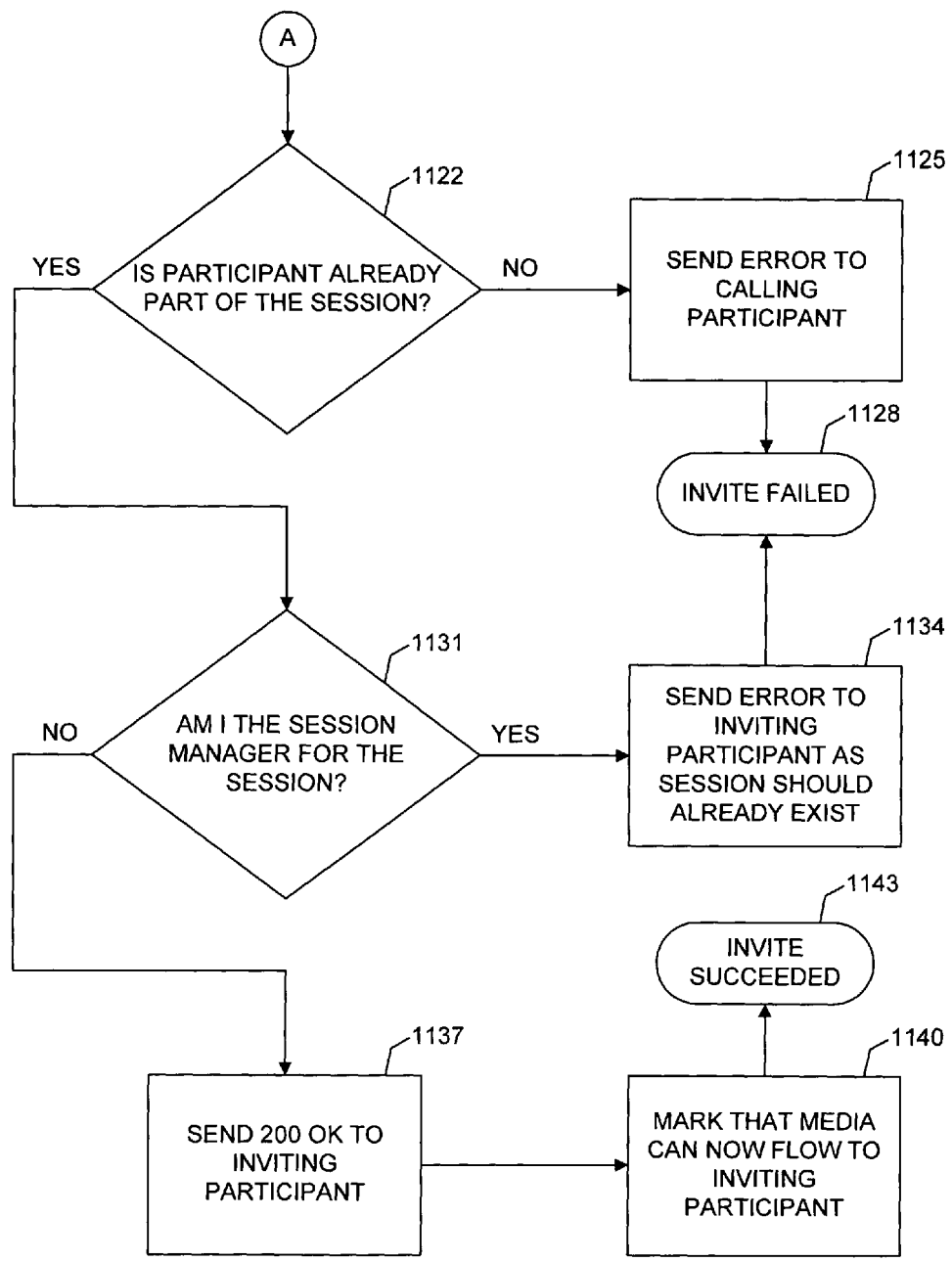

FIGS. 11A-11B display a flowchart representation of a method 1100 of inviting a new participant 404 into an already established communications session 100 from the view of an existing participant 404 in accordance with an exemplary embodiment of the present invention. Similar to the description above for FIGS. 8A-8B, 9A-9B, and 10A-10C, Participant A 404a, Participant B 404b, and Participant C 404c are members of a current communications session 100 with Participant A 404a performing the functions of the session manager 401. If Participant B 404b wants Participant D 404d to join the communications session 100, then Participant B 404b must "refer" the session manager 401 to send an INVITE message to Participant D 404d. Participant A 404a, Participant B 404b, and Participant C 404c must properly accept the join INVITE from Participant D 404d in order for Participant D 404d to successfully join the communications session 100. For purposes of the following description, the method 1100 will be discussed with reference to Participant C 404c. A substantially similar method 1100 will be followed with reference to all current participants 404 within the communications session 100 that Participant D 404d wishes to join.

After starting at step 1101, Participant C 404c proceeds to step 1104 of method 1100 where Participant C 404c receives a join INVITE message from Participant D 404d. Participant C 404c advances to step 1107 where Participant C 404c determines whether the join INVITE message from Participant D 404d refers to an existing communications session 100. If Participant C 404c determines that the join INVITE message from Participant D 404d does not refer to an existing communications session 100, then Participant C 404c proceeds to step 1110 where the INVITE message refers to the initiation of a new communications session 100 discussed above in more detail with regard to FIGS. 5A-5B and 6A-6B.

If, however, at step 1107, Participant C 404c determines that the join INVITE message refers to an existing communications session 100, then Participant C 404c proceeds to step 1113 where Participant C 404c determines whether the communications session 100 referred to in the INVITE message from Participant D 404d is known. If Participant C 404c determines that the communications session 100 referred to in the INVITE message from Participant D 404d is not known, then Participant C 404c advances to step 1116 where Participant C 404c sends an unknown session error to Participant D 404d. Participant C 404c then ends operation in accordance with method 1100 at step 1119, due to the failure of the join INVITE from Participant D 404d to Participant C 404c.

If at step 1113, Participant C 404c determines that the communications session 100 referred to in the INVITE message from Participant D 404d is known, then Participant C 404c proceeds to step 1122 where Participant C 404c determines whether it is already part of the communications session 100 referred to in the INVITE message from Participant D 404d. If Participant C 404c determines that it is not already part of the communications session 100 referred to in the INVITE message from Participant D 404d, then Participant C 404c proceeds to step 1125 where Participant C 404c sends an error message to Participant D 404d indicating that Participant C 404c is not already a member of the communications session 100. Participant C 404c terminates operation in accordance with method 1100 at step 1128, due to the failure of the join INVITE from Participant D 404d to Participant C 404c. Participant C 404c determines whether it is a member of the existing communications session 100 for two reasons. First, Participant C 404c might have left the communications session 100 after Participant D 404d received the list of participants 404 from the session manager 401, but before receiving the INVITE message from Participant D 404d. Second, Participant C 404c might be registered at multiple end points, only one of which is a participant 404 of the communications session 100 referred to in the INVITE message. When an INVITE message for Participant C 404c is received, the INVITE message will branch to all of the end points, including those that are not part of the existing communications session 100. Step 1122 ensures that only the appropriate participants 404 will be allowed to accept the INVITE.

Otherwise, if at step 1122, Participant C 404c determines that it is already a member of the communications session 100 referred to in the INVITE message from Participant D 404d, then Participant C 404c advances to step 1131 where Participant C 404c determines whether it is the session manager 401 for the communications session 100 referred to in the INVITE message from Participant D 404d. If Participant C 404c determines that it is the session manager 401 for the communications session 100 referred to in the INVITE message from Participant D 404d, then Participant C 404c proceeds to step 1134 where Participant C 404c sends an error message to Participant D 404d, indicating that the communications session 100 referred to in the INVITE message should already exist between Participant C 404c and Participant D 404d. Participant C 404c then terminates operation in accordance with method 1100 at step 1128, due to failure of the INVITE between Participant D 404d and Participant C 404c.

If, however, at step 1131, Participant C 404c determines that it is not the session manager 401 for the communications session 100 referred to in the INVITE message from Participant D 404d, then Participant C 404c advances to step 1137 where it sends a 200 OK message to Participant D 404d. Next, Participant C 404c proceeds to step 1140 where Participant C 404c designates a media connection between Participant C 404c and Participant D 404d as existing. Participant C 404c then ends operation in accordance with method 1100 at step 1143.

Table 4 illustrates the call flow (i.e., using SIP) for Participant B 404b referring Participant D 404d into an existing communications session 100, where Participant A 404a is the session manager 401 and Participant D 404d supports multiparty communications sessions 100. To ensure stability, the session manager 401 will not process an invitation request until all previous invitations have been processed. A sequential invitation scheme guarantees that new participants 404 receive a correct list of participants 404 within the communications session 100. In Table 4, the "REFER" header field indicates that the SIP message is referring a participant 404. The "Refer-To" header field indicates who is being referred and the "ReferredBy" header field indicates who has made the referral. Also in Table 4, the "202 Accepted" header field contains the SIP response code (i.e., 202) and the reason phrase (i.e., accepted) that indicates whether a participant 404 has accepted an invitation. The "NOTIFY" header field indicates that the message is a notification to a participant 404 that an event has occurred, a change has occurred, that information needs to be updated, or the like. Additionally, the "Event" header indicates what type of event is occurring or has occurred. The "TriggeredInvite" header field determines whether the SIP message is an INVITE to join an existing multiparty session 100.

TABLE 4

| | |
|---|---|
| B->A: | REFER sip:D@microsoft.com SIP/2.0<br>To: sip:A@microsoft.com<br>From: Participant B <sip:B@microsoft.com><br>Call-ID: 1234567890<br>CSeq: 1 REFER<br>Refer-To: D@microsoft.com<br>Referred-By: B@microsoft.com |
| A->B: | SIP/2.0 202 Accepted<br>To: sip:A@microsoft.com<br>From: Participant B <sip:B@microsoft.com><br>Call-ID: 1234567890<br>CSeq: 1 REFER<br>Refer-To: D@microsoft.com |
| A->D: | INVITE sip:D@microsoft.com SIP/2.0<br>To: sip:D@microsoft.com<br>From: Participant A <sip:A@microsoft.com><br>Call-ID: 1234567890<br>CSeq: 1 INVITE<br>Contact: sip:A@microsoft.com<br>Referred-By: B@microsoft.com<br>Required: multiparty<br>EndPoints: Participant A <sip:A@microsoft.com>,<br>Participant B<sip:B@microsoft.com>,<br>Participant C <sip:C@microsoft.com>,<br>Participant D <sip:D@microsoft.com><br>RM: sip:A@microsoft.com<br>Content-Type: application/SDP<br>Content-Length: XXX<br>...<br>m = message 5060 sip sip:D@microsoft.com<br>... |
| D->A: | SIP/2.0 200 OK<br>To: sip:D@microsoft.com<br>From: Participant A <sip:A@microsoft.com><br>Call-ID: 1234567890<br>CSeq: 1 REFER<br>Require: multiparty<br>Contact: sip:A@microsoft.com<br>Content-Length: 0 |

TABLE 4-continued

| | |
|---|---|
| A->D: | ACK sip:D@microsoft.com SIP/2.0<br>To: sip:D@microsoft.com<br>From: Participant A <sip:A@microsoft.com><br>Call-ID 1234567890<br>CSeq: 1 ACK<br>Content-Length: 0 |
| A->B: | NOTIFY B@microsoft.com<br>To: sip:B@microsoft.com<br>From: Participant A <sip:A@microsoft.com><br>Call-ID: 1234567890<br>CSeq: 2 NOTIFY<br>Event: REFER<br>Contact: sip:B@microsoft.com<br>Content-Type: application/sip<br>Content-Length: 16<br>...<br>SIP/2.0 200 OK<br>... |
| D->B: | INVITE sip:B@microsoft.com SIP/2.0<br>To: sip:B@microsoft.com<br>From: Participant D <sip:D@microsoft.com><br>Call-ID: 1234567890<br>CSeq: 1 INVITE<br>Contact: sip:D@microsoft.com<br>Supported: multiparty<br>TriggeredInvite: TRUE<br>RM: sip:A@microsoft.com<br>Content-Type: application/SDP<br>Content-Length: XXX<br>...<br>m = message 5060 sip sip:D@microsoft.com<br>... |
| D->C: | INVITE sip:C@microsoft.com SIP/2.0<br>To: sip:C@microsoft.com<br>From: Participant D <sip:D@microsoft.com><br>Call-ID: 1234567890<br>CSeq: 1 INVITE<br>Contact: sip:C@microsoft.com<br>Supported: multiparty<br>TriggeredInvite: TRUE<br>RM: sip:A@microsoft.com<br>Content-Type: application/SDP<br>Content-Length: XXX<br>...<br>m = message 5060 sip sip:A@microsoft.com<br>... |
| B->D: | SIP/2.0 200 OK<br>To: sip:B@microsoft.com<br>From: Participant D <sip:D@microsoft.com><br>Call-ID: 1234567890<br>CSeq: 1 INVITE<br>Require: multiparty<br>Contact: sip:B@microsoft.com<br>Content-Length: XXX<br>...<br>m = message 5060 sip sip:B@microsoft.com<br>... |
| C->D: | SIP/2.0 200 OK<br>To: sip:C@microsoft.com<br>From: Participant D <sip:D@microsoft.com><br>Call-ID: 1234567890<br>CSeq: 1 INVITE<br>Require: multiparty<br>Contact: sip:C@microsoft.com<br>Content-Length: XXX<br>...<br>m = message 5060 sip sip:C@microsoft.com<br>... |
| D->B: | ACK sip:B@microsoft.com SIP/2.0<br>To: sip:B@microsoft.com<br>From: Participant D <sip:D@microsoft.com><br>Call-ID: 1234567890<br>CSeq: 1 ACK<br>Content-Length: 0 |

TABLE 4-continued

```
D->C:    ACK sip:C@microsoft.com SIP/2.0
         To: sip:C@microsoft.com
         From: Participant D <sip:D@microsoft.com>
         Call-ID: 1234567890
         CSeq: 1 ACK
         Content-Length: 0
```

Once Participant D 404d receives a SIP 200 OK response from Participant B 404b in reference to a join INVITE from Participant D 404d, media may begin to flow between Participant D 404d and Participant B 404b even though Participant D 404d may have outstanding INVITES to the other participants 404. If one of the outstanding INVITES fails, then Participant B 404b will be notified that Participant D 404d is leaving the communications session 100. Such an event is called a "flicker", because Participant B 404b observes Participant D 404d become available to the communications session 100 and then leave the communications session 100 within a short period of time.

Several safeguards exist for capturing errors within a communications session 100, but are not necessarily an integral part of the present invention. If Participant D 404d is not online when "invited" by the session manager 401 to the communications session 100, then the relevant registrar (i.e., the session manager 401) associated with the "invite" will return a "480 Temporarily Unavailable" error message. If Participant D 404d does not wish to join the communications session 100, then Participant D 404d will send a "603 Decline" error message to the session manager 401. If Participant D 404d has blocked communications with the session manager 401, then Participant D 404d will send a "480 Temporarily Unavailable" error message to the session manager 401. If Participant D 404d receives an INVITE message from the session manager 401 for a communications session 100 before Participant C 404c leaves the communications session 100, but Participant D 404d then tries to connect to Participant C 404c after Participant C 404c has left the communications session 100, then Participant C 404c will return a "610 Session Not Known" error message to Participant D 404d. Participant D 404d will then assume that Participant C 404c is no longer part of the original communications session 100. If Participant D 404d cannot successfully send an INVITE message to any other participant 404, then Participant D 404d should not join the communications session 100 and should cancel all pending INVITES and disconnect any successful connections. Then, Participant D 404d should send a "BYE" SIP message to notify the session manager 401 that it could not join the communications session 100.

One skilled in the art will recognize that the present invention may be implemented without the safeguards for capturing errors described above. Such safeguards add value to the present invention, but are not absolutely necessary for multi-party communications sessions 100.

Figure 12:
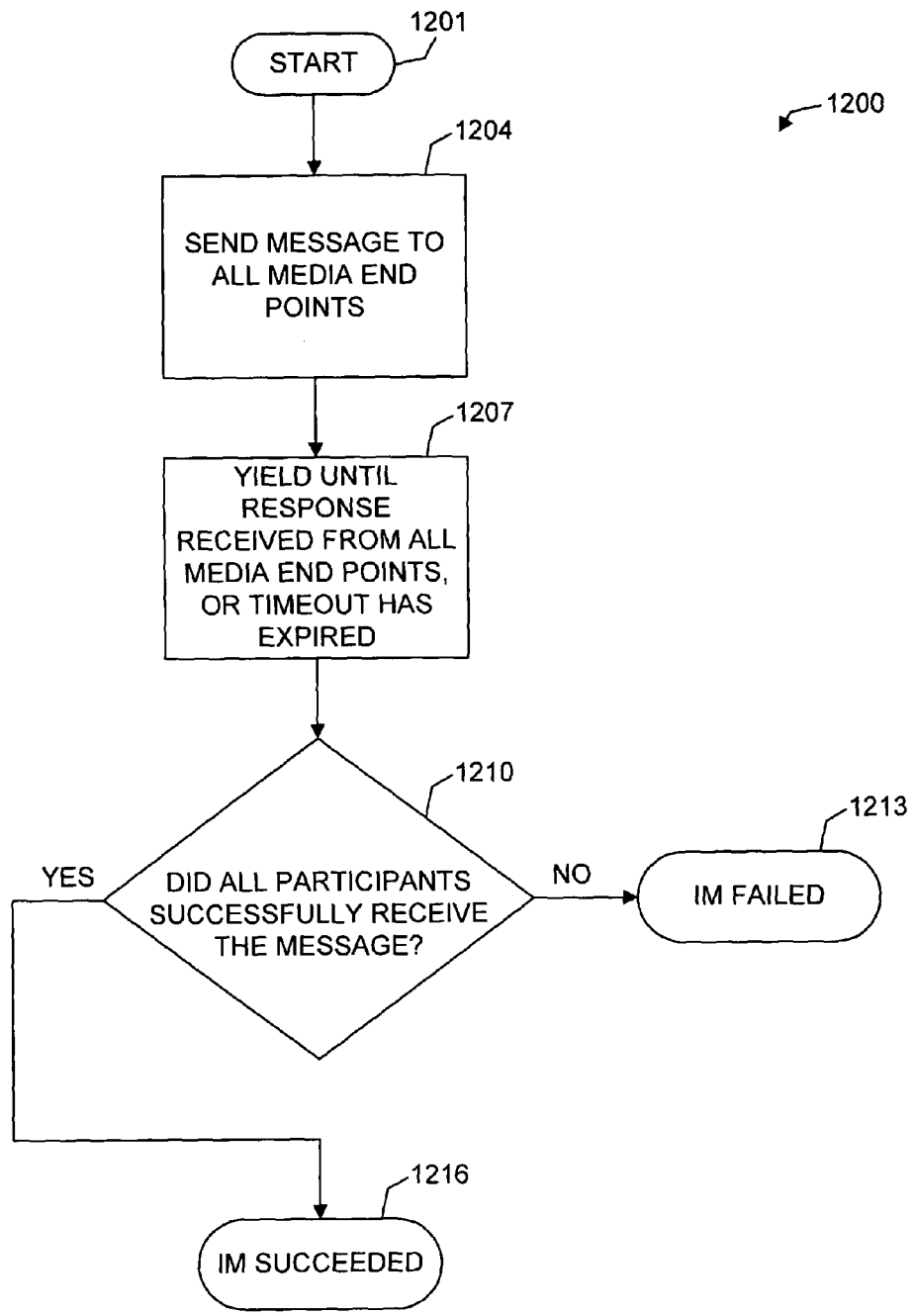
FIG. 12 displays a flowchart representation of a method of sending instant messages in a multiparty communications session in accordance with an exemplary embodiment of the present invention.

FIG. 12 displays a flowchart representation of a method 1200 of sending instant messages in a multiparty communications session 100 in accordance with an exemplary embodiment of the present invention. Instant messaging between multiple participants 404 requires a different reporting scheme for errors. Instead of reporting that a message has been received by one participant 404, it should report if the message was received by all the participants 404, otherwise an error should be generated. For purposes of FIG. 12, Participant D 404d has successfully joined the communications session 100 with Participant A 404a, Participant B 404b, and Participant C 404c. Participant D 404d desires to send an instant message to all of the participants 404 within the communications session 100, namely Participant A 404a, Participant B 404b, and Participant C 404c.

After starting at step 1201, Participant D 404d proceeds to step 1204 of method 1200 where Participant D 404d sends a message to all media end points (i.e., all other participants 404). Participant D 404d then proceeds to step 1207 where it yields until a response has been received from all media end points or a timeout period has expired. Next, at step 1210, Participant D 404d determines whether all the media end points received the message, by evaluating responses from each of the media end points. If Participant D 404d determines that a media end point did not receive the message sent by Participant D 404d, then Participant D 404d terminates operation in accordance with method 1200 at step 1213, due to the failure of the instant message from Participant D 404d to all media end points. Otherwise, if Participant D 404d determines that all of the media end points received the message, then Participant D 404d terminates operation in accordance with method 1200 at step 1216.

One skilled in the art will recognize that alternative reporting schemes may be implemented within the spirit of the present invention. For example, and not limitation, instant messages may be sent to all connected parties and success and failure messages may be reported for all participants 404 as separate events.

Figure 13A:
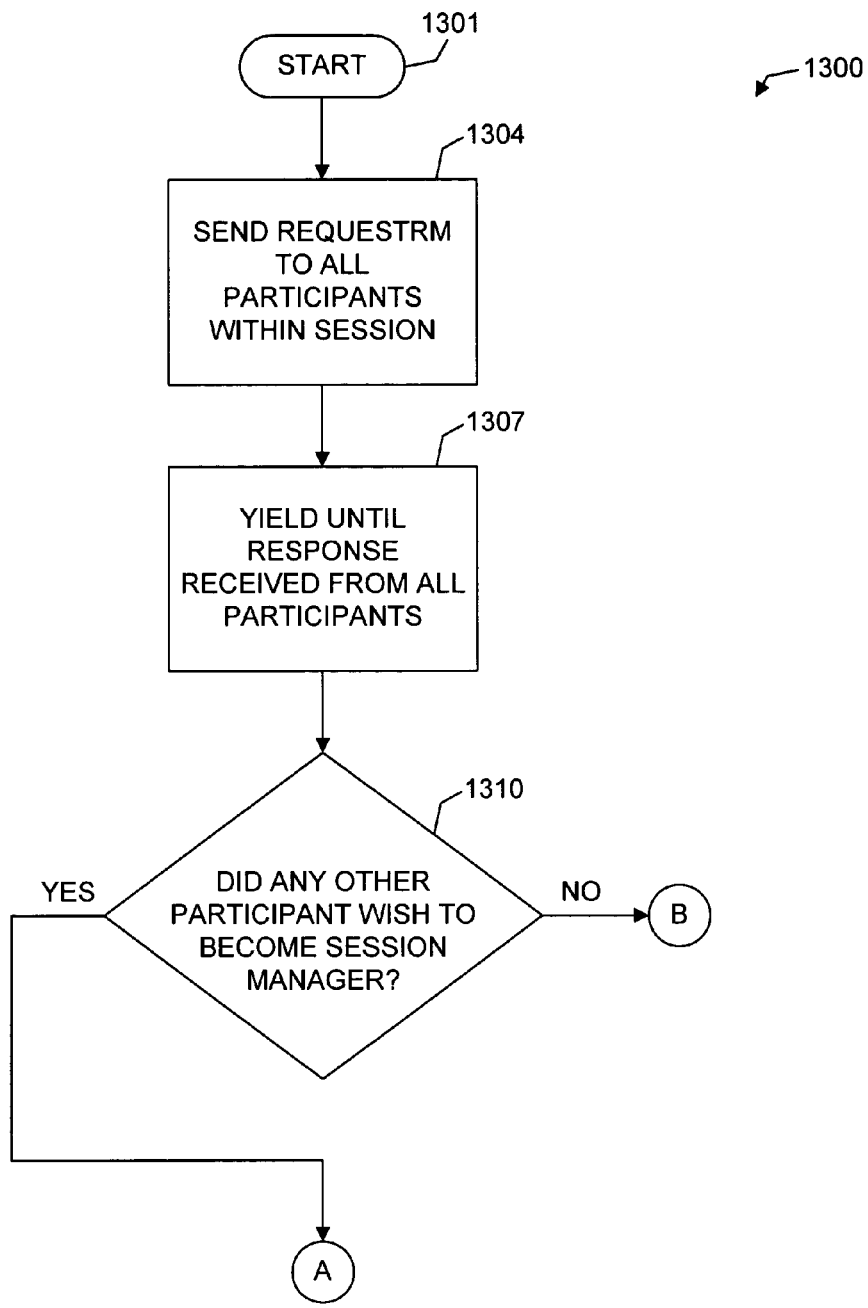
FIGS. 13A-13B display a flowchart representation of a method of designating a new communications session manager in accordance with an exemplary embodiment of the present invention.
Figure 13B:
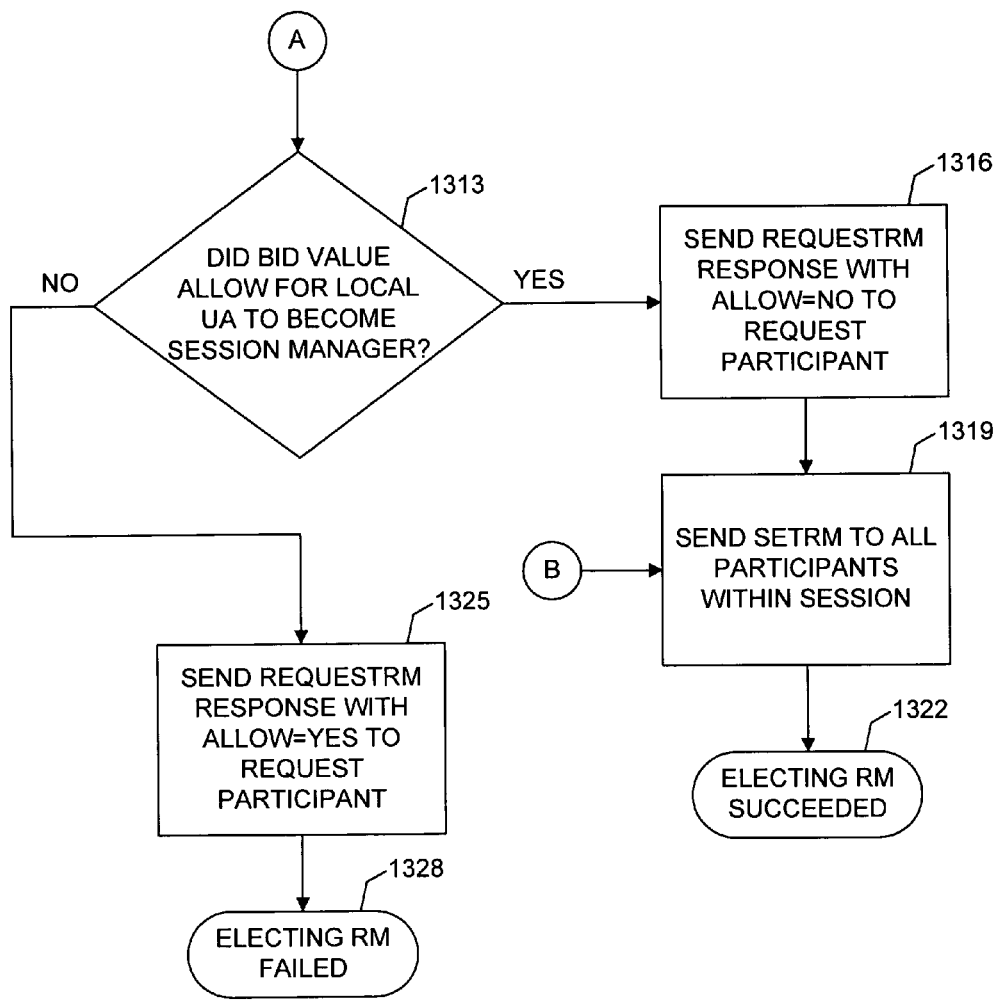

FIGS. 13A-13B display a flowchart representation of a method 1300 of designating a new communications session manager 401 in accordance with an exemplary embodiment of the present invention. When a user agent 107 determines that the communications session 100 no longer has a session manager 401 (i.e., the participant 404 acting as session manager exits the session) one of the existing user agents 107 must become the session manager 401. To become the session manager 401 for the communications session 100, a participant 404 must send an INFO message to all other participants 404 indicating that it wants to become the new session manager 401. Once all of the other participants 404 acknowledge the request, then the requesting participant 404 sends a final INFO message to all other participants 404 stating that it has become the new session manager 401. The two INFO messages are needed to provide a mechanism for election of the new session manager 401 if more than one participant 404 desires to be the session manager 401 of the current communications session 100. When a participant 404 requests to be session manager 401, a random number is generated and associated with the request. Thus, if two participants 404 want to be session manager 401 the participant 404 with the lower number will send an acceptance message to the other participant 404, while the participant 404 with the higher number will send a decline to the other participant 404. The participant 404 that receives acceptance from all other participants 404 may then send the second INFO message to all other participants 404 stating that it will become the session manager 401. The INFO message contains source identification information that is used by the other participants 404 to mark a logical construct indicating that the source of the SETRM message is the session manager 401. One skilled in the art will recognize that different bidding methods exist including, but not limited to, random number generation, comparison of interne protocol addresses, alphabetical comparison, or seniority (i.e., participant 404 connected to the communications session 100 for the longest period of time).

For the purposes of FIGS. 13A-13B, Participant A 404a desires to be the session manager 401 of an existing communication session 100, where Participant C 404c may also desire to be the session manager 401. After starting at step

1301, Participant A 404a proceeds to step 1304 of method 1300 where Participant A 404a sends a REQUESTRM message to all other participants 404 within the communications session 100, when it is determined that a session manager 401 is needed. Participant A 404a then proceeds to step 1307 where Participant A 404a yields until a response is received from all other participants 404. Next, Participant A 404a advances to step 1310 once Participant A 404a receives all of the responses from the other participants 404. At step 1310, Participant A 404a determines whether any other participant 404 wishes to become session manager 401 by evaluating the responses from the other participants 404. If Participant A 404a determines that no other participant 404 wishes to become session manager 401 of the communication session 100, then Participant A 404a proceeds to step 1319 where Participant A 404a sends a SETRM message to all participants 404 within the communications session 100 indicating that it has become the session manager 401. Participant A then terminates operation in accordance with method 1300 at step 1322, due to the successful election of a session manager 401.

If, however, at step 1310, Participant A 404a determines that another participant 404 (i.e., Participant C 404c) wishes to be session manager 401, then Participant A 404a advances to step 1313 where Participant A 404a determines whether the bid value (i.e., random number) allows it to become the session manager 401, by comparing the bid value of Participant A 404a with the bid number of Participant C 404c. The bid value is generated and included in a REQUESTRM message when a participant 404 desires to become session manager 401. One skilled in the art will recognize that different techniques may be used to implement a bidding scheme. Such values may be random numbers, where the greatest number wins the bid. In a case where the bid numbers are the same, a tie-breaking mechanism may be developed (i.e., comparison of internet protocol addresses) and utilized to break the tie.

If Participant A 404a determines that Participant A's 404a bid value does not allow it to become the session manager 401, then Participant A 404a proceeds to step 1325 where Participant A 404a accepts Participants C's 404c request to be session manager 401, by sending a REQUESTRM response with ALLOW=YES to Participant C 404c. Participant A 404a then terminates operation in accordance with method 1300 at step 1328, due to the failure of Participant A's 404a election as session manager 401.

If at step 1313, Participant A 404a determines its bid value allows Participant A 404a to become the session manager 401, then Participant A 404a advances to step 1316 where Participant A 404a declines Participant C's 404c request to become session manager 401, by sending a REQUESTRM response with ALLOW=NO to Participant C 404c. Participant A 404a then proceeds to step 1319 of session 1300 where Participant A 404a sends a SETRM message to all participants 404 within the communications session 100 indicating that it has become the session manager 401. Participant A 404a ends operation in accordance with method 1300 at step 1322, due to the success of Participant A's 404a election as session manager 401.

Table 5 illustrates the call flow (i.e., using SIP) for Participant B 404b requesting to be session manager 401 where Participant C 404c accepts the request. If, however, Participant C 404c also wanted to be session manager 401, then Participant C 404c would set the "allow" attribute to "no" or "false" and at the same time send a REQUESTRM message to Participant B 404b. The participant 404 with the higher number would automatically be selected as the session manager 401 with the participant 404 with the lower number accepting the REQUESTRM message from the participant 404 with the higher number. Also, the participant 404 with the higher number would decline the REQUESTRM message from the participant 404 with the lower number. It should be noted that, the REQUESTRM and SETRM header fields are not part of the basic Session Initiation Protocol, but are instead part of a layer of functionality and structure provided by the present invention on top of the Session Initiation Protocol to assist in designating and electing a participant 404 as the session manager 401.

TABLE 5

| | |
|---|---|
| B->C: | INFO C@microsoft.com |
| | To: sip:C@microsoft.com |
| | From: Participant B <sip:B@microsoft.com> |
| | Call-ID: 1234567890 |
| | CSeq: 20 INFO |
| | Contact: sip:B@microsoft.com |
| | Content-Type: application/ms-mim |
| | Content-Length: XXX |
| | <action> |
| | <RequestRM uri = "sip:B@microsoft.com" bid = "1234"/> |
| | </action> |
| C->B: | SIP/2.0 200 OK |
| | To: sip:C@microsoft.com |
| | From: Participant B <sip:B@microsoft.com> |
| | Call-ID: 1234567890 |
| | CSeq: 20 INFO |
| | Contact: sip:C@microsoft.com |
| | Content-Type: application/ms-mim |
| | Content-Length: XXX |
| | <action> |
| | <RequestRMResponse uri = "sip:B@microsoft.com" allow = "true"/> |
| | </action> |
| B->C: | INFO C@microsoft.com |
| | To: sip:C@microsoft.com |
| | From: Participant B <sip:B@microsoft.com> |
| | Call-ID: 1234567890 |
| | CSeq: 21 INFO |
| | Contact: sip:B@microsoft.com |
| | Content-Type: application/ms-mim |
| | Content-Length: XXX |
| | <action> |
| | <SetRM uri = "sip:B@microsoft.com"/> |
| | </action> |
| C->B: | SIP/2.0 200 OK |
| | To: sip:C@microsoft.com |
| | From: Participant B <sip:B@microsoft.com> |
| | Call-ID: 1234567890 |
| | CSeq: 21 INFO |
| | Contact: sip:C@microsoft.com |
| | Content-Type: application/ms-mim |
| | Content-Length: XXX |
| | <action> |
| | <SetRMResponse uri = "sip:B@microsoft.com"/> |
| | </action> |

Whereas the present invention has been described in detail it is understood that variations and modifications can be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

What is claimed is:

1. A method of initiating and managing a multiparty communications session, the method comprising:
   creating a communication link between a first participant and a second participant for the communication of media therebetween;
   creating a communication link between the first participant and a third participant for the communication of media therebetween;
   creating a communication link between the second participant and the third participant for the communication of media therebetween;
   determining whether a characteristic associated with the first participant meets a predetermined criterion;
   upon determining that the characteristic meets the predetermined criterion, designating the first participant as a session manager of the multiparty communications session for receiving all session management messages from participants in the multiparty communications session and for:
      controlling the admission of an additional participant to the multiparty communications session;
      responding to a participant exiting the multiparty communications session;
      maintaining an authoritative list of participants in the multiparty communications session;
      updating the authoritative list of participants in the multiparty communications session in response to participants joining and exiting the multiparty communications session; and
      exclusively synchronizing the authoritative list of participants in the multiparty communications session with each of the participants in the multiparty communications session;
   issuing, by the first participant, an invitation inviting the additional participant to join the multiparty communications session, wherein the invitation includes the authoritative list of participants in the multiparty communications session, the authoritative list of participants including at least the second and third participants; and
   when the additional participant is admitted to the multiparty communications session, creating a communication link between the additional participant and the first participant for the communication of media therebetween, a communication link between the additional participant and the second participant for the communication of media therebetween, and a communication link between the additional participant and the third participant for the communication of media therebetween, so that the additional participant can communicate with the other participants without having to route the communication through the session manager,
   wherein each participant is an end point for the bi-directional communication of media in the multiparty communications session,
   wherein the additional participant uses the authoritative list of participants to join the multiparty communications session, by:
      sending a message to each of at least the second and third participants;
      receiving a successful response to the message from each of at least the second and third participants;
      when the additional participant has received the successful response to the message from each of at least the second and third participants, sending a message to the first participant; and
      creating a communication link between the additional participant and each of at least the second and third participants for the communication of media therebetween, and
   wherein only the first participant that has been designated as the session manager of the multiparty communications session may issue the invitation inviting the additional participant to join the multiparty communications session.

2. The method of claim 1, further comprising, in response to the first participant exiting the multiparty communications session:
   sending, by the second participant in the multiparty communications session, a first request to become a new session manager;
   sending, by the third participant in the multiparty communications session, a second request to become a new session manager; and
   based on the first and second requests, designating either the second participant or the third participant as the session manager.

3. The method of claim 1, wherein the method further comprises:
   establishing a communication link between the first participant and the second participant for the communication of session management messages therebetween; and
   establishing a communication link between the first participant and the third participant for the communication of session management messages therebetween.

4. The method of claim 1, wherein the method further comprises:
   issuing, by the first participant, an invitation inviting the second participant to join the multiparty communications session;
   receiving, by the second participant, the invitation from the first participant; and
   issuing to the first participant, by the second participant, a response to the invitation.

5. The method of claim 4, wherein the invitation includes the authoritative list of participants in the multiparty communications session.

6. The method of claim wherein the method further comprises:
   issuing, by the second participant, a request to invite the third participant to the multiparty communications session;
   receiving, by the first participant, the request to invite from the second participant; and
   issuing, by the first participant, an invitation inviting the third participant to the multiparty communications session.

7. The method of claim 1, further comprising:
   receiving, by the session manager, a request from one of the participants in the multiparty communications session to invite a second additional participant;
   inviting, by the session manager, the second additional participant to join the multiparty communications session;
   determining, by the session manager, that the second additional participant does not support multiparty communications; and
   establishing, by the session manager, a one-on-one communications session between the session manager and the second additional participant.

8. A method of managing a multiparty communications session, the method comprising:
- creating a full-mesh of communication links for a first participant, a second participant, and a third participant for the multiparty communications session;
- determining whether the first participant meets a session manager criterion,
- after determining that the first participant meets the session manager criterion, designating the first participant in the multiparty communications session as a session manager of the multiparty communications system for;
  - receiving all session management messages from participants in the multiparty communications session;
  - exclusively maintaining an authoritative list of participants in the multiparty communications session;
  - exclusively controlling an admission of an additional participant to the multiparty communications session;
  - exclusively inviting the additional participant to join the multiparty communication session;
  - exclusively providing the authoritative list of participants to the additional participant, wherein the additional participant used the authoritative list of participants to join the multiparty communications session, by;
    - sending a message to each of at least the second and third participants;
    - receiving a successful response to the message from each of at least the second and third participants;
    - when the additional participant has received the successful response to the message from each of at least the second and third participants sending a message to the first participant; and
    - creating a communication link between the additional participant and each of at least the second and third participants for the communication of media therebetween; and
  - exclusively synchronizing the authoritative list of participants with the participants in the multiparty communications session to reflect the additional participant,
- wherein not ail communications between participants in the multiparty communications session are routed through the session manager.

9. The method of claim 8, further comprising:
receiving from the second participant the multiparty communications session a request to invite the additional participant to the multiparty communications session; and
determining that the additional participant is not already participating in the multiparty communications session,
wherein the additional participant is invited to in the multiparty communications session in response to determining that the additional participant is not already participating in the multiparty communications session.

10. The method of claim 9, further comprising:
notifying the first participant that the additional participant accepted the invitation as indicated by the received successful response to join the multiparty communications session.

11. The method of claim 8, further comprising;
implementing a rule set for the multiparty communications session wherein the rule set includes at least one of a rule restricting access to the multiparty communications session, a rule limiting a duration of the multiparty communications session, and a rule limiting a number of participants in the multiparty communications session;
applying the rule set; and:
based upon the application of the rule set, determining that the additional participant is allowed to join the multiparty communications session.

12. The method of claim 8, further comprising:
determining that the second participant exited the multiparty communications session;
updating the authoritative list of participants in the multiparty communications session in response to the exit of the second participant; and
providing the updated authoritative list of participants to at least one remaining participant in the multiparty communications session.

13. The method of claim 8, further comprising: leaving, by the session manager, the multiparty communications session;
sending, by the second participant in the multiparty communications session, a first request to become a new session manager;
sending by the third participant in the multiparty communications session, a second request to become a new session manager; and
based on the flirt and second requests, designating either the second participant or the third participant as the new session manager.

14. The method of claim 8, further comprising:
receiving, by the session manager, a request from a participant in the multiparty communications session to invite a second additional participant;
inviting, by the session manager, the second additional participant to join the multiparty communications session;
determining, by the session manager, that the second additional participant does not support multiparty communications; and
establishing, by the session manager, a one-on-one communications session between the session manager and the second additional participant.

15. A method of managing multiparty communications session having multiple participants, the method comprising:
- creating a full-mess of communication links for a first participant, a second participant, and a third participant for the multiparty communications session;
- determining whether the first participant meets a session manager criterion;
- after determining that the first participant meets the session manager criterion,
  - designating the first participant as a session manager of the multiparty communications session;
  - exclusively maintaining, by the session manager, an authoritative list of participants in the multiparty communications session;
  - exclusively inviting, by the session manager, an additional participant to join the multiparty communications session;
  - exclusively providing, by the session manager, the authoritative list of participants to the additional participant, wherein all additional participants joining the multiparty communications session obtain the authoritative list of participants from the session manager, such that the possibility of multiple participants receiving different lists of participants is reduced wherein the additional participants uses the authoritative list of participants to join the multiparty communications session, by;
    - sending a message to each of at least the second and third participants;

receiving a successful response to the message from each of at least the second and third participants;

when additional participant has received the successful response the message from each of at least the second and third participants, sending a message to the first participant; and creating a communication link between the additional participant and each of at least the second and third participants for the communication of media therebetween;

exclusively receiving, by the session manager, an acceptance by the additional participant of the invitation to join the multiparty communications session;

after receiving, exclusively updating, by the session manager, the authoritative list of participants to include the additional participant; and after updating, exclusively synchronizing, by the session manager, the authoritative list of participants with the other participants in the multiparty communications system to reflect the additional participant.

16. The method of claim 15, further comprising:

leaving, by the session manager, the multiparty communications session;

sending, by the second participant in the multiparty communications session, a first request to become a new session manager;

sending, by the third participant in the multiparty communications session, a second request to become a new session manager; and based on the first and second requests, designating either the second participant or the third participant as the new session manager.

17. The method of claim 15, further comprising, receiving, by the session manager, a request from one of the multiple participants in the multiparty communications session to invite a second additional participant;

inviting, by the session manager, the second additional participant to join the multiparty communications session;

determining, by the session manager, that the second addition participant does; not support multiparty communications; and establishing, by the session manager, a one-on-one communications session between the session manager and the second additional participant.

18. The method of claim 15 wherein the session manager receives all session management calls in the multiparty communications session, such that the authoritative list of participants properly reflects the participants in the multiparty communications session.

19. The method of claim 15, further comprising, prior to designating the one of the multiple participants in the multiparty communications session as the session manager, determining that a characteristic associated with the one of the multiple participants meets a predetermined criterion.

20. The method of claim 15, further comprising:

implementing, by the session manager, a set of one or more rules for the multiparty communications session; and determining, by the session manager, that the additional participant satisfies the set of one or more rules.

21. A computer-readable storage device encoded with computer-executable instructions for initiating and managing a multiparty communications session, by a method comprising:

creating a full-mesh of communication links for a first participant, a second participant, and a third participant for the multiparty communications session;

determining whether the first participant meets a session manager criterion;

upon determining that the first participant meets the session manager criterion, designating the first participant meets session manager of the multiparty communications session for;

exclusively maintaining and authoritative list of participants in the multiparty communications session;

exclusively updating the authoritative list of participants in the multiparty communications session in response to participants joining and exiting the multiparty communications session;

exclusively issuing an invitation inviting the additional participant to join the multiparty communications session, the invitation including the authoritative list of participants in the multiparty communications session so that the additional participant uses the authoritative list to establish communications links with at least the second participant and the third participant to effect a full-mesh of communication links for the first participant, the second participant, the third participant, and the additional participant by;

sending a message to each of at least the second and third participants;

receiving a successful response to the message from each of at least the second and third participants;

when the additional participant has received the successful response to the message from each of at least the second and third participants, sending a message to the first participant; and creating a communication link between the additional participant and each of at least the second and third participants for the communication of media therebetween; and exclusively synchronizing the authoritative list of participants in the multiparty communications session with each of the participants in the multiparty communications session to ensure that each participant has a synchronized copy of the authoritative list.

22. The computer-readable storage device of claim 21 wherein only the first participant that has been designated as the session manager of the multiparty communications session may issue the invitation inviting the additional participant to join the multiparty communications session.

23. The computer-readable storage device of claim 21 wherein the session manager ensures that participants join the multiparty communications session sequentially to reduce a possibility of disjointed communications.

24. The computer-readable storage device of claim 21 wherein the session manager receives invitation requests to add a participant to the multiparty communications session but does not process a received invitation request until all previously received invitation requests have been processed.

25. The computer-readable storage device of claim 24 wherein the processing of a received invitation request includes sending to the participant to be added the authoritative list of participants that includes participants added based on previously received invitation requests.

26. The computer-readable storage device of claim 21 wherein when the session manager exits the multiparty communications session and multiple participants request to be session manager, each of the multiple participants generates a random number and a new session manager is selected based on the generated random number.

27. The computer-readable storage device of claim 26 wherein the participant that generated the highest random number is selected as the new session manager.

28. The computer-readable storage device of claim 26 wherein the new session manager notifies the other participants of the new session manager.

* * * * *